US011736277B2

(12) United States Patent
Wei et al.

(10) Patent No.: US 11,736,277 B2
(45) Date of Patent: *Aug. 22, 2023

(54) TECHNOLOGIES FOR INTERNET OF THINGS KEY MANAGEMENT

(71) Applicant: INTEL CORPORATION, Santa Clara, CA (US)

(72) Inventors: Changzhen Wei, Shanghai (CN); Junyuan Wang, Shanghai (CN); Ned Smith, Beaverton, OR (US); Weigang Li, Shanghai (CN); Ping Yu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 17/463,453

(22) Filed: Aug. 31, 2021

(65) Prior Publication Data

US 2022/0060322 A1 Feb. 24, 2022

Related U.S. Application Data

(63) Continuation of application No. 16/649,192, filed as application No. PCT/CN2017/119925 on Dec. 29, 2017, now Pat. No. 11,115,193.

(51) Int. Cl.
*H04L 9/40* (2022.01)
*H04L 9/08* (2006.01)
(Continued)

(52) U.S. Cl.
CPC ............ *H04L 9/0833* (2013.01); *G06F 21/45* (2013.01); *G16Y 30/10* (2020.01); *H04L 9/0822* (2013.01);
(Continued)

(58) Field of Classification Search
CPC ..... H04L 9/0833; H04L 9/0822; H04L 9/321; H04L 9/3215; H04L 9/3255;
(Continued)

(56) References Cited

U.S. PATENT DOCUMENTS 6,584,566 B1 * 6/2003 Hardjono .............. H04L 9/0891
380/278
7,234,063 B1 * 6/2007 Baugher ............... H04L 9/0891
713/153
(Continued)

FOREIGN PATENT DOCUMENTS

CN 106888083 6/2017

OTHER PUBLICATIONS

Rajat Chaudhary, et al., "Lattice-Based Public Key Cryptosystem for Internet of Things Environment:Challenges and Solutions," in IEEE Internet of Things Journal, vol. 6, No. 3, 13 pages, Jun. 2019.

(Continued)

*Primary Examiner* — Techane Gergiso
(74) *Attorney, Agent, or Firm* — Hanley, Flight & Zimmerman, LLC

(57) ABSTRACT

Technologies for key management of internet-of-things (IoT) devices include an IoT device, an authority center server, and a group management server. The IoT device is configured to authenticate with an authority center server via an offline communication channel, receive a group member private key as a function of the authentication with the authority center server, and authenticate with a group management server via a secure online communication channel using the group member private key. The IoT device is further configured to receive a group shared key as a function of the authentication with the group management server, encrypt secret data with the group shared key, and
(Continued)

transmit the encrypted secret data to the group management server. Other embodiments are described herein.

26 Claims, 11 Drawing Sheets

(51) Int. Cl.
G16Y 30/10 (2020.01)
G06F 21/45 (2013.01)
H04L 9/32 (2006.01)

(52) U.S. Cl.
CPC ............ H04L 9/321 (2013.01); H04L 9/3215 (2013.01); H04L 9/3255 (2013.01); H04L 63/0442 (2013.01)

(58) Field of Classification Search
CPC . H04L 63/0442; H04L 63/062; H04L 63/064; H04L 63/065; H04L 9/0825; H04L 9/0819; H04L 9/0836; H04L 9/083; G16Y 30/10; G06F 21/45; H04W 12/04; H04W 12/041; H04W 12/0433; H04W 12/0431

See application file for complete search history.

(56) References Cited

U.S. PATENT DOCUMENTS

| 7,434,047 | B2 | 10/2008 | Sharma |
| 8,204,228 | B2* | 6/2012 | Weis ..................... H04L 9/0833 726/26 |
| 8,452,014 | B2* | 5/2013 | Ratliff .................. H04L 9/0833 380/278 |
| 10,219,152 | B2 | 2/2019 | Muhanna et al. |
| 10,700,860 | B2* | 6/2020 | Walrant ................ H04L 9/0891 |
| 11,115,193 | B2 | 9/2021 | Wei et al. |
| 2004/0131187 | A1* | 7/2004 | Takao ................... H04L 63/104 380/255 |
| 2005/0198170 | A1* | 9/2005 | LeMay ................ H04L 63/045 709/206 |
| 2006/0029226 | A1 | 2/2006 | Han et al. |
| 2008/0307054 | A1 | 12/2008 | Kamarthy et al. |
| 2011/0194698 | A1* | 8/2011 | Asano ................... H04L 9/0643 380/282 |
| 2014/0181514 | A1 | 6/2014 | Aoyagi et al. |
| 2015/0312041 | A1* | 10/2015 | Choi .................... H04L 63/0861 713/175 |
| 2016/0149901 | A1 | 5/2016 | Liu et al. |
| 2017/0078875 | A1* | 3/2017 | Muhanna .............. H04L 9/0827 |
| 2018/0006829 | A1* | 1/2018 | Kravitz ................. H04W 12/06 |
| 2018/0123784 | A1* | 5/2018 | Gehrmann ............ H04L 9/0869 |
| 2018/0176298 | A1* | 6/2018 | Holmes .................... H04L 65/80 |
| 2021/0020349 | A1 | 1/2021 | Omura et al. |

OTHER PUBLICATIONS

Luca Veltri, et al., "A novel batch-based group key management protocol applied to the Internet of Things", Ad Hoc Networks, vol. 11, Issue 8, 2013, 14 pages.

Rodrigo Roman, et al., "Key management systems for sensor networks in the context of the Internet of Things", Computers & Electrical Engineering, vol. 37, Issue 2, 2011, 13 pages.

The International Bureau of WIPO, "International Preliminary Report on Patentability," issued in connection with application No. PCT/CN2017/119925, dated Jun. 30, 2020, 6 pages.

PCT Search Report and Written Opinion prepared for PCT/CN2017/119925, dated Sep. 25, 2018, 8 pages.

United States Patent and Trademark Office, "Notice of Allowance," mailed in connection with U.S. Appl. No. 16/649,192, dated May 5, 2021, 13 pages.

* cited by examiner

TECHNOLOGIES FOR INTERNET OF THINGS KEY MANAGEMENT

CROSS-REFERENCE TO RELATED APPLICATIONS

This patent arises from a continuation of U.S. patent application Ser. No. 16/649,192, filed Mar. 20, 2020, entitled "TECHNOLOGIES FOR INTERNET OF THINGS KEY MANAGEMENT," which is a National Stage Entry of PCT Patent Application No. PCT/CN2017/119925, filed Dec. 29, 2017, entitled "TECHNOLOGIES FOR INTERNET OF THINGS KEY MANAGEMENT". The contents of these applications are hereby incorporated herein by reference in their entireties.

BACKGROUND

Many types of devices, such as sensors, vehicles, appliances, industrial equipment, and other things, are gaining computing resources and network capability. Sometimes described as the Internet of Things (IoT), modern computing systems may include cloud-based servers, network infrastructure, and connected edge devices that all work together to perform networked application functions. In certain applications, one IoT connected edge device may need to communicate with other IoT connected edge devices. Additionally or alternatively, an IoT connected edge device may need to communicate with a remote server in the cloud. However, maintaining the security of such communications can be difficult.

Typical IoT connected edge devices may be small devices with low power consumption and thus typically include relatively low processing power or other computing resources. As such, the resources necessary to perform reliable security operations (e.g., public key infrastructure (PKI)) tend to be limited. Additionally, key management is problematic, which has resulted in various key exchange protocols (e.g., Fluffy) for resource constrained environments (e.g., IoT networks, fog networks, etc.). However, such present key exchange protocols, in addition to still needing to address certain security concerns, assume asymmetric authentication, attestation, and key wrapping algorithms, which are constrained by high computation costs that are often multiplied across multiple certificates in a certificate chain. Further, each IoT connected edge device should undergo mutual attestation and device/user authentication, which existing technologies struggle to meet in IoT networks at scale (e.g., due to the high latency of present attestation protocols typically involving a $3^{rd}$ party broker).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
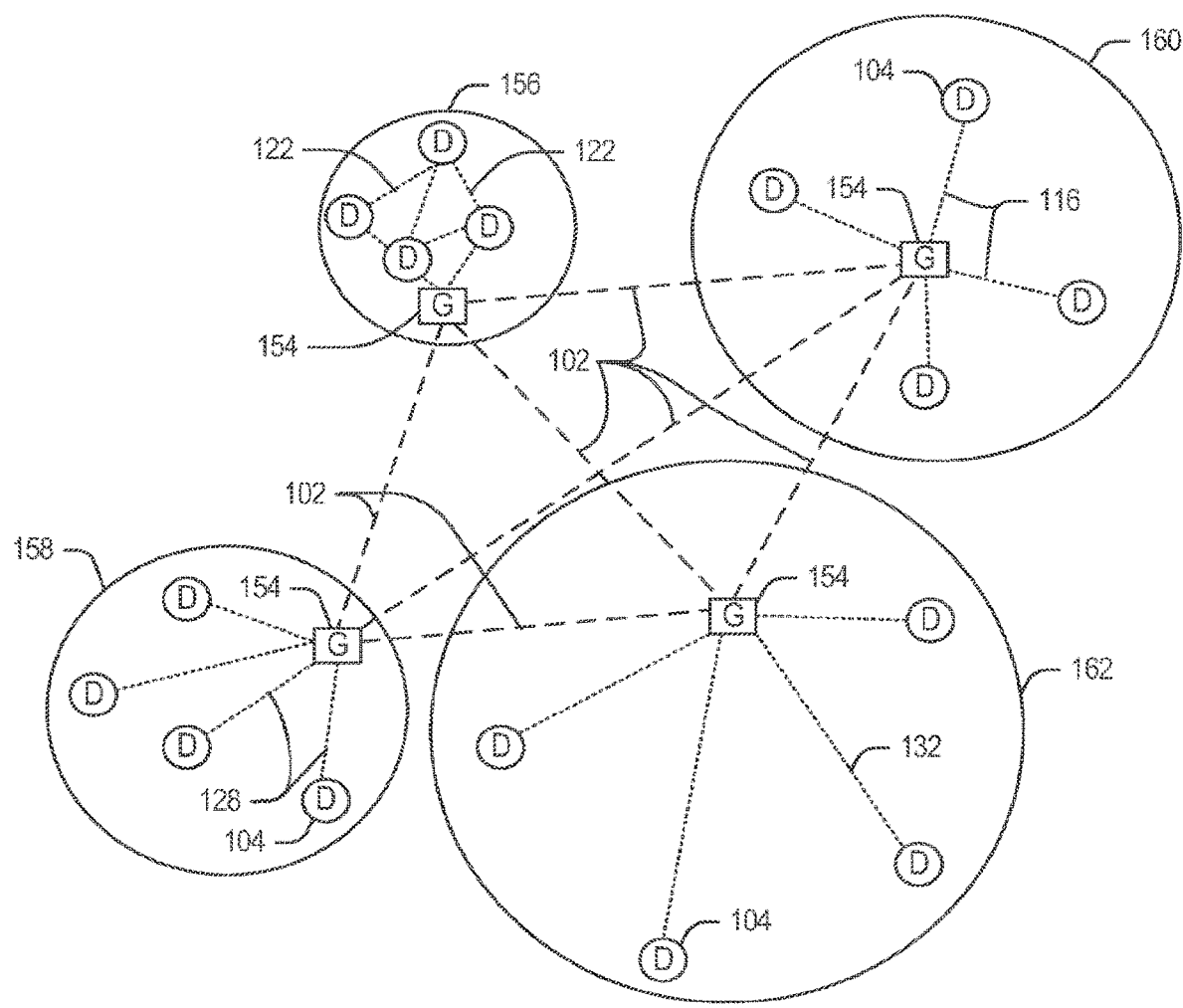
FIG. 1 is a simplified domain topology of at least one embodiment for respective internet-of-things (IoT) networks coupled through links to respective gateways.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 2:
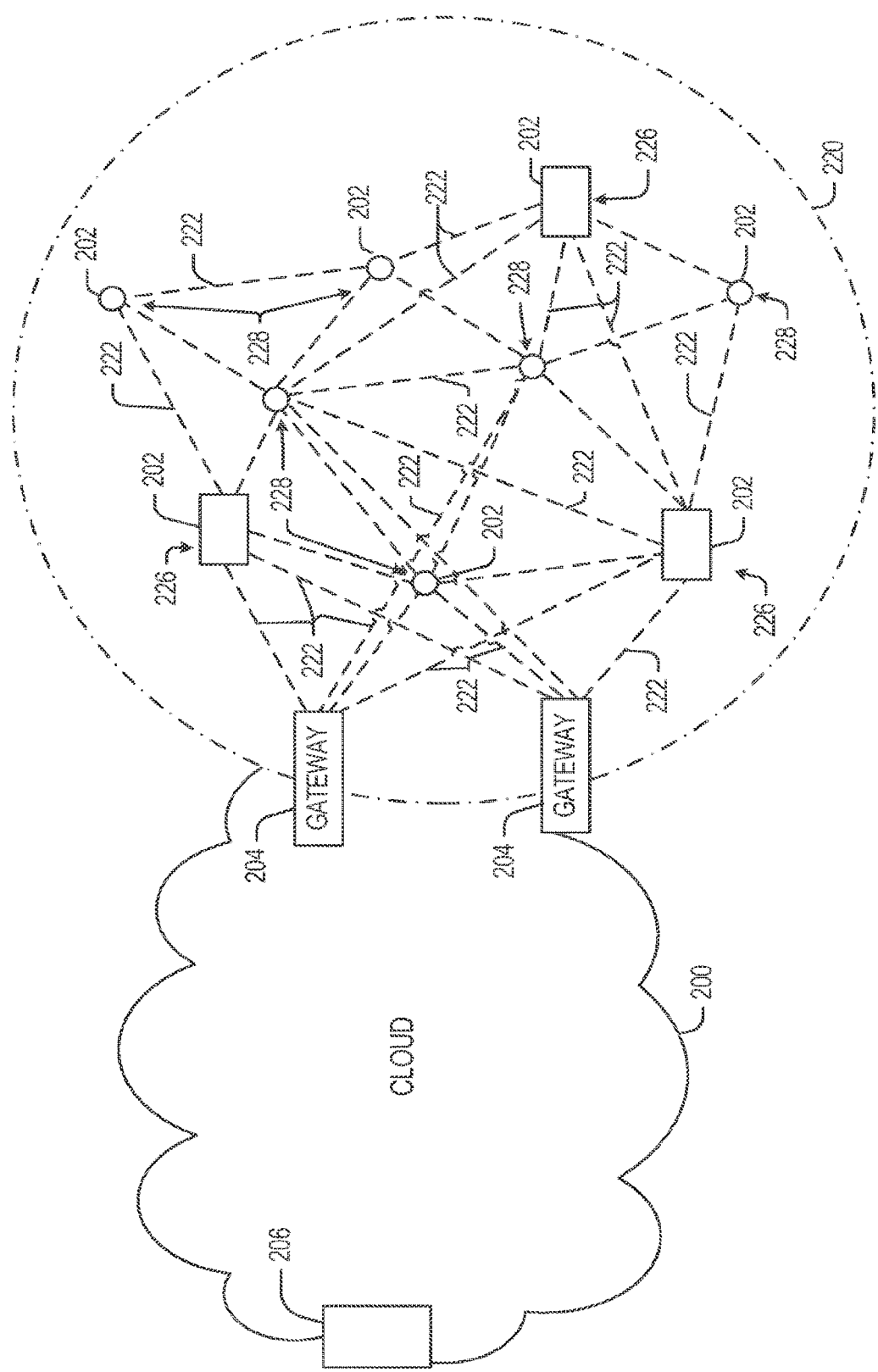
FIG. 2 is a simplified cloud computing network in communication with a mesh network of IoT devices operating as a fog device at the edge of the cloud computing network.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 1 and 2, present a number of new challenges in a heterogeneous network of connectivity comprising a combination of wired and wireless technologies.

FIG. 1 specifically provides a simplified drawing of a domain topology that may be used for a number of internet-of-things (IoT) networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 3 and 12.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 2 below.

FIG. 2 illustrates a cloud computing network in communication with a mesh network of IoT devices (devices 202) operating as a fog device at the edge of the cloud computing network. The mesh network of IoT devices may be termed a fog 220, operating at the edge of the cloud 200. To simplify the diagram, not every IoT device 202 is labeled.

The fog 220 may be considered to be a massively interconnected network wherein a number of IoT devices 202 are in communications with each other, for example, by radio links 222. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog 220, and may also provide the backend process function for data obtained from sensors 228, such as motion data, flow data, temperature data, and the like. The data aggregators 226 may collect data from any number of the sensors 228, and perform the back end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and allowing the data aggregators 226 or gateways 204 to process the data.

Communications from any IoT device 202 may be passed along a convenient path (e.g., a most convenient path) between any of the IoT devices 202 to reach the gateways 204. In these networks, the number of interconnections provide substantial redundancy, allowing communications to be maintained, even with the loss of a number of IoT devices 202. Further, the use of a mesh network may allow IoT devices 202 that are very low power or located at a distance from infrastructure to be used, as the range to connect to another IoT device 202 may be much less than the range to connect to the gateways 204.

The fog 220 provided from these IoT devices 202 may be presented to devices in the cloud 200, such as a server 206, as a single device located at the edge of the cloud 200, e.g., a fog device. In this example, the alerts coming from the fog device may be sent without being identified as coming from a specific IoT device 202 within the fog 220. In this fashion, the fog 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog device may be configured in a declarative programming style, allowing the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog 220 device selecting the IoT devices 202, such as particular sensors 228, needed to answer the query. The data from these sensors 228 may then be aggregated and analyzed by any combination of the sensors 228, data aggregators 226, or gateways 204, before being sent on by the fog 220 device to the server 206 to answer the query. In this example, IoT devices 202 in the fog 220 may select the sensors 228 used based on the query, such as adding data from flow sensors or temperature sensors. Further, if some of the IoT devices 202 are not operational, other IoT devices 202 in the fog 220 device may provide analogous data, if available.

In other examples, the operations and functionality described above may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 3:
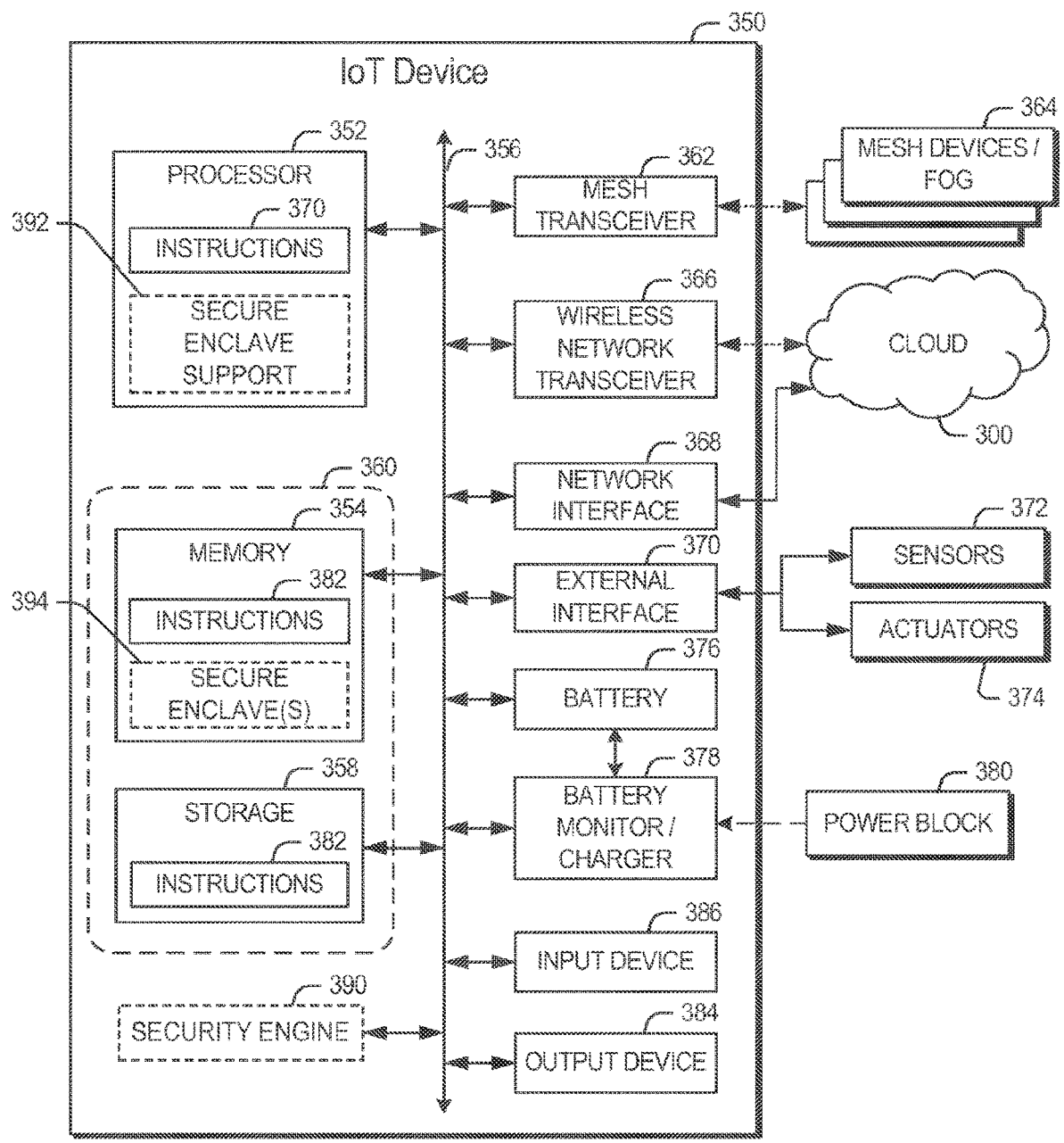
FIG. 3 is a simplified block diagram of at least one embodiment of an IoT processing system architecture upon which any one or more of the techniques (e.g., operations, processes, methods, and methodologies) discussed herein may be performed.

Referring now to FIG. 3, an illustrative block diagram is shown of components that may be present in an IoT device 350 for implementing the techniques described herein. The IoT device 350 may include any combinations of the components shown in the example or referenced in the disclosure above. The components may be implemented as ICs, portions thereof, discrete electronic devices, or other modules, logic, hardware, software, firmware, or a combination thereof adapted in the IoT device 350, or as components otherwise incorporated within a chassis of a larger system. Additionally, the block diagram of FIG. 3 is intended to depict a high-level view of components of the IoT device 350. However, some of the components shown may be omitted, additional components may be present, and different arrangement of the components shown may occur in other implementations.

The IoT device 350 may include a processor 352, which may be a microprocessor, a multi-core processor, a multi-threaded processor, an ultra-low voltage processor, an embedded processor, or other known processing element. The processor 352 may be a part of a system on a chip (SoC) in which the processor 352 and other components are formed into a single integrated circuit, or a single package, such as the Edison™ or Galileo™ SoC boards from Intel. As an example, the processor 352 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 352 may communicate with a system memory 354 over an interconnect 356 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 358 may also couple to the processor 352 via the interconnect 356. In an example the storage 358 may be implemented via a solid state disk drive (SSDD). Other devices that may be used for the storage 358 include flash memory cards, such as SD cards, microSD cards, xD picture cards, and the like, and USB flash drives. In low power implementations, the storage 358 may be on-die memory or registers associated with the processor 352. However, in some examples, the storage 358 may be implemented using a micro hard disk drive (HDD). Further, any number of new technologies may be used for the storage 358 in addition to, or instead of, the technologies described, such resistance change memories, phase change memories, holographic memories, or chemical memories, among others.

The components may communicate over the interconnect 356. The interconnect 356 may include any number of technologies, including industry standard architecture (ISA), extended ISA (EISA), peripheral component interconnect (PCI), peripheral component interconnect extended (PCIx), PCI express (PCIe), or any number of other technologies. The interconnect 356 may be a proprietary bus, for example, used in a SoC based system. Other bus systems may be included, such as an I2C interface, an SPI interface, point to point interfaces, and a power bus, among others.

The interconnect 356 may couple the processor 352 to a mesh transceiver 362, for communications with other mesh devices 364. The mesh transceiver 362 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 364. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 362 may communicate using multiple standards or radios for communications at different range. For example, the IoT device 350 may communicate with close devices, e.g., within about 10 meters, using a local transceiver based on BLE, or another low power radio, to save power. More distant mesh devices 364, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 366 may be included to communicate with devices or services in the cloud 300 via local or wide area network protocols. The wireless network transceiver 366 may be a LPWA transceiver that follows the IEEE 802.15.4, or IEEE 802.15.4g standards, among others. The IoT device 350 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 362 and wireless network transceiver 366, as described herein. For example, the radio transceivers 362 and 366 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 362 and 366 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 366, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 368 may be included to provide a wired communication to the cloud 300 or to other devices, such as the mesh devices 364. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 368 may be included to allow connect to a second network, for example, a NIC 368 providing communications to the cloud over Ethernet, and a second NIC 368 providing communications to other devices over another type of network.

The interconnect 356 may couple the processor 352 to an external interface 370 that is used to connect external devices or subsystems. The external devices may include sensors 372, such as accelerometers, level sensors, flow sensors, optical light sensors, camera sensors, temperature sensors, global positioning system (GPS) sensors, pressure sensors, barometric pressure sensors, and the like. The external interface 370 further may be used to connect the IoT device 350 to actuators 374, such as power switches, valve actuators, an audible sound generator, a visual warning device, and the like.

In some optional examples, various input/output (I/O) devices may be present within, or connected to, the IoT device 350. For example, a display or other output device 384 may be included to show information, such as sensor readings or actuator position. An input device 386, such as a touch screen or keypad may be included to accept input. An output device 384 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 350.

A battery 376 may power the IoT device 350, although in examples in which the IoT device 350 is mounted in a fixed location, it may have a power supply coupled to an electrical grid. The battery 376 may be a lithium ion battery, or a metal-air battery, such as a zinc-air battery, an aluminum-air battery, a lithium-air battery, and the like.

A battery monitor/charger 378 may be included in the IoT device 350 to track the state of charge (SoCh) of the battery 376. The battery monitor/charger 378 may be used to monitor other parameters of the battery 376 to provide failure predictions, such as the state of health (SoH) and the state of function (SoF) of the battery 376. The battery monitor/charger 378 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 378 may communicate the information on the battery 376 to the processor 352 over the interconnect 356. The battery monitor/charger 378 may also include an analog-to-digital (ADC) convertor that allows the processor 352 to directly monitor the voltage of the battery 376 or the current flow from the battery 376. The battery parameters may be used to determine actions that the IoT device 350 may perform, such as transmission frequency, mesh network operation, sensing frequency, and the like.

A power block 380, or other power supply coupled to a grid, may be coupled with the battery monitor/charger 378 to charge the battery 376. In some examples, the power block 380 may be replaced with a wireless power receiver to obtain the power wirelessly, for example, through a loop antenna in the IoT device 350. A wireless battery charging circuit, such as an LTC4020 chip from Linear Technologies of Milpitas, Calif., among others, may be included in the battery monitor/charger 378. The specific charging circuits chosen depend on the size of the battery 376, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 358 may include instructions 382 in the form of software, firmware, or hardware commands to implement the techniques described herein. Although such instructions 382 are shown as code blocks included in the memory 354 and the storage 358, it may be understood that any of the code blocks may be replaced with hardwired circuits, for example, built into an application specific integrated circuit (ASIC).

In an example, the instructions 382 provided via the memory 354, the storage 358, or the processor 352 may be embodied as a non-transitory, machine readable medium 360 including code to direct the processor 352 to perform electronic operations in the IoT device 350. The processor 352 may access the non-transitory, machine readable medium 360 over the interconnect 356. The illustrative processor 352 includes a secure enclave support 392. The secure enclave support 392 allows the processor 352 to establish a trusted execution environment (TEE) known as a secure enclave (see, e.g., the secure enclave 394), in which executing code may be measured, verified, and/or otherwise determined to be authentic. Additionally, code and data included in the secure enclave may be encrypted or otherwise protected from being accessed by code executing outside of the secure enclave 394. For example, code and data included in the secure enclave may be protected by hardware protection mechanisms of the processor 352 while being executed or while being stored in certain protected cache memory (not shown) of the processor 352. The code and data included in the secure enclave may be encrypted when stored in a shared cache or the system memory 354. The secure enclave support 392 may be embodied as a set of processor instruction extensions that allows the processor 352 to establish one or more secure enclaves in the system memory 354. For example, the secure enclave support 392 may be embodied as Intel® Software Guard Extensions (SGX) technology. In some embodiments, the system memory 354 may be used to store the contents of one or more secure enclaves. When stored by the system memory 354, the contents of the secure enclave may be encrypted to prevent unauthorized access.

The non-transitory, machine readable medium 360 may be embodied by devices described for the storage 358 of FIG. 3 or may include specific storage units such as optical disks, flash drives, or any number of other hardware devices. Additionally, the non-transitory, machine readable medium 360 may include instructions to direct the processor 352 to perform a specific sequence or flow of actions, for example, as described with respect to the flowchart(s) and block diagram(s) of operations and functionality depicted above. In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions.

A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

The illustrative IoT device 350 additionally includes include a security engine 390, which may be embodied as any hardware component(s) or circuitry capable of providing security-related services to the IoT device 350. In particular, the security engine 390 may include a microprocessor, microcontroller, or other embedded controller capable of executing firmware and/or other code independently and securely from the processor 352. Thus, the security engine 390 may be used to establish a trusted execution environment separate from code executed by the processor 352. The security engine 390 may communicate with the processor 352 and/or other components of the IoT device 350 over a dedicated bus, such as a host embedded controller interface (HECI).

The security engine 390 may also provide remote configuration, control, or management of the IoT device 350. In the illustrative embodiment, the security engine 390 is embodied as a converged security and manageability engine (CSME) incorporated in a SoC of the IoT device 350. In some embodiments, the security engine 390 may be embodied as a manageability engine, an out-of-band processor, a Trusted Platform Module (TPM), or other security engine device or collection of devices. Further, in some embodiments, the security engine 390 is also capable of communicating using the interconnect 356 or a dedicated communication circuit independently of the state of the IoT device 350 (e.g., independently of the state of the processor 352), also known as "out-of-band" communication.

Figure 4:
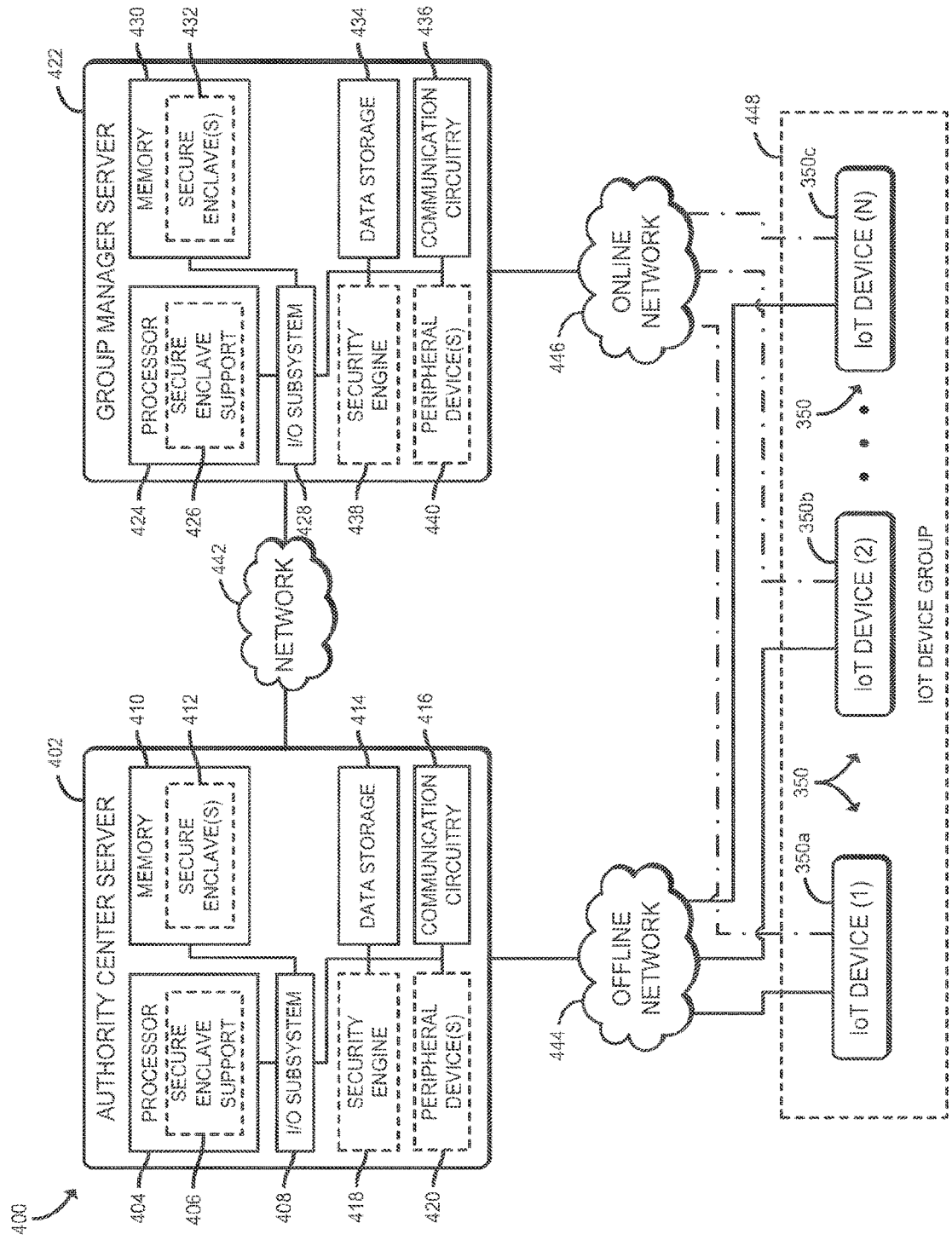
FIG. 4 is a simplified block diagram of at least one embodiment of a system for key management for IoT devices that includes an authority center server, a group manager server, and multiple IoT devices.

Referring now to FIG. 4, in an illustrative embodiment, a system 400 for key management in a network of IoT devices (e.g., cloud hosted IoT devices) includes an authority center server 402, a group manager server 422, and multiple IoT devices 350. As will be described in further detail below, the system 400 enables group session key agreement, updating, revocation, and efficient IoT device onboarding authentication mechanisms leveraging a group hierarchy as described herein. Unlike present technologies in which temporal symmetric keys (e.g., typical of web transport layer security (TLS) interactions) are discarded (e.g., after each representational state transfer (REST) exchange) and authentication relies on asymmetric keys for each interaction, the group symmetric keys are preserved in a TEE (e.g., an Intel SGX, an Intel QuickAssist Technology (QAT), etc.) such that they can be shared between the IoT devices 350 (e.g., as a consequence of doing datagram TLS (DTLS) handshaking, RESTful secure exchanges, etc.). Therefore, the IoT devices 350 can rely on symmetric authentication for some of the interactions because the symmetric keys rare managed to maintain authentication and authorization contexts, thereby improving performance of the more resource intensive asymmetric authentication operations.

In use, each IoT device 350 joins a group (see, e.g., the IoT device group 448) in which it can communicate with other IoT devices 350 of the group. To do so, as described in further detail below, the IoT device 350 authenticates itself with the authority center server 402 during an offline (i.e., isolated from network access) authentication phase (see, e.g., the method 800 of FIG. 8) in which the authority center server 402 assigns a group member private key to the IoT device 350. Subsequent to having received the group member private key, the IoT device 350 verifies itself (i.e., using a signature generated to attest the IoT device 350 using the received group member private key) with the group manager server 422 and receives a group shared key, which is a symmetric key, via a secure communication channel established between the IoT device 350 and the group manager server 422. As such, the IoT device 350 may communicate with other IoT devices of the group to which the IoT device corresponds as a function of the group shared key.

The authority center server 402 may be embodied as any type of computation or compute device capable of performing the functions described herein, including, without limitation, a computer, a server (e.g., stand-alone, rack-mounted, blade, etc.), a network appliance (e.g., physical or virtual), a web appliance, a distributed computing system, a processor-based system, and/or a multiprocessor system. As shown in FIG. 4, the illustrative authority center server 402 includes a processor 404, an input/output (I/O) subsystem 408, a memory 410, a data storage device 414, communication circuitry 416, and, in some embodiments, a security engine 418 and/or one or more peripheral devices 420. Of course, in other embodiments, the authority center server 402 may include alternative and/or additional components, such as those commonly found in a computing device (e.g., a graphics processing unit (GPU), a power supply, fans, etc.). Additionally, in some embodiments, one or more of the illustrative components may be incorporated in, or otherwise form a portion of, another component. For example, the memory 410, or portions thereof, may be incorporated into the processor 404, in some embodiments. Further, in some embodiments, one or more of the illustrative components may be omitted from the authority center server 402.

The processor 404 may be embodied as any type of central processing unit capable of carrying out instructions to perform the functions described herein. For example, the processor 404 may be embodied as one or more single core processors, one or more single or multi-core processors, field-programmable gate arrays (FPGAs), digital signal processors (DSPs), microcontrollers, or other processor or processing/controlling circuit(s). Irrespective of the embodiment of the processor 404, each processor core (not shown) of the processor 404 may be embodied as an independent logical execution unit capable of executing programmed instructions. In some embodiments, the processor core may include a portion of cache memory (i.e., memory that can be accessed more quickly than the memory 410) and functional units usable to independently execute programs or threads, which are not shown to preserve clarity of the description.

The illustrative processor 404 includes a secure enclave support 406. Similar to the secure enclave support 392 of the illustrative IoT device 350 of FIG. 3, the secure enclave support 406 allows the processor 404 to establish a trusted execution environment (TEE) known as a secure enclave (see, e.g., the secure enclave(s) 412), in which executing code may be measured, verified, and/or otherwise determined to be authentic. Additionally, code and data included in the secure enclave may be encrypted or otherwise protected from being accessed by code executing outside of the secure enclave(s) 412. For example, code and data included in the secure enclave may be protected by hardware protection mechanisms of the processor 404 while being executed or while being stored in certain protected cache memory (not shown) of the processor 404. The code and data included in the secure enclave may be encrypted when stored in a shared cache or the memory 410. The secure enclave support 406 may be embodied as a set of processor instruction extensions that allows the processor 404 to establish one or more secure enclaves in the memory 410, illustratively shown as secure enclave(s) 412. For example, the secure enclave support 406 may be embodied as Intel® SGX technology. In some embodiments, the memory 410 may be used to store the contents of one or more secure enclaves. When stored by the memory 410, the contents of the secure enclave may be encrypted to prevent unauthorized access.

The memory 410 may be embodied as any type of volatile or non-volatile memory or data storage capable of performing the functions described herein. In operation, the memory 410 may store various data and software used during operation of the authority center server 402, such as operating systems, applications, programs, libraries, and drivers. The memory 410 is communicatively coupled to the processor 404 via the I/O subsystem 408, which may be embodied as circuitry and/or components to facilitate input/output operations with the processor 404, the memory 410, and other components of the authority center server 402. For example, the I/O subsystem 408 may be embodied as, or otherwise include, memory controller hubs, input/output control hubs, firmware devices, communication links (i.e., point-to-point links, bus links, wires, cables, light guides, printed circuit board traces, etc.), and/or other components and subsystems to facilitate the input/output operations. In some embodiments, the I/O subsystem 408 may form a portion of a SoC and be incorporated, along with the processor 404, the memory 410, and other components of the authority center server 402, on a single integrated circuit chip.

The data storage device 414 may be embodied as any type of device or devices configured for short-term or long-term storage of data such as, for example, memory devices and circuits, memory cards, hard disk drives, solid-state drives, or other data storage devices. It should be appreciated that the data storage device 414 and/or the memory 410 (e.g., the computer-readable storage media) may store various data as described herein, including operating systems, applications, programs, libraries, drivers, instructions, etc., capable of being executed by a processor (e.g., the processor 404) of the authority center server 402.

The communication circuitry 416 may be embodied as any communication circuit, device, or collection thereof, capable of enabling communications between the authority center server 402 and other computing devices, such as the group manager server 422, as well as any network communication enabling devices, such as an access point, network switch/router, etc., to allow communication over the network 442. Additionally, the communication circuitry 416 enables the authority center server 402 to communicate with the IoT devices 350 via an offline network 444. As such, the communication circuitry 416 may be configured to use any one or more wireless and/or wired communication technologies and associated protocols (e.g., Ethernet, Bluetooth®, Wi-Fi®, WiMAX, LTE, 5G, etc.) to effect such communication.

It should be appreciated that, in some embodiments, the communication circuitry 416 may include specialized circuitry, hardware, or combination thereof to perform pipeline logic (e.g., hardware algorithms) for performing the functions described herein, including processing network packets (e.g., parse received network packets, determine destination computing devices for each received network packets, forward the network packets to a particular buffer queue of a respective host buffer of the network computing device 118, etc.), perform computational functions, etc.

In some embodiments, performance of one or more of the functions of communication circuitry 416 as described herein may be performed by specialized circuitry, hardware, or combination thereof of the communication circuitry 416, which may be embodied as a SoC or otherwise form a portion of a SoC of the authority center server 402 (e.g., incorporated on a single integrated circuit chip along with the processor 404, the memory 410, and/or other components of the authority center server 402). Alternatively, in some embodiments, the specialized circuitry, hardware, or combination thereof may be embodied as one or more discrete processing units of the authority center server 402, each of which may be capable of performing one or more of the functions described herein.

The security engine 418, similar to the security engine 390 of the illustrative IoT device 350 of FIG. 3, may be embodied as any hardware component(s) or circuitry capable of providing security-related services to the authority center server 402. In particular, the security engine 418 may include a microprocessor, microcontroller, or other embedded controller capable of executing firmware and/or other code independently and securely from the processor 404. Thus, the security engine 418 may be used to establish a trusted execution environment separate from code executed by the processor 404. The security engine 418 may communicate with the processor 404 and/or other components of the authority center server 402 over a dedicated bus, such as a HECI.

The security engine 418 may also provide remote configuration, control, or management of the authority center server 402. In the illustrative embodiment, the security engine 418 is embodied as a CSME incorporated in a SoC of the authority center server 402. In some embodiments, the security engine 418 may be embodied as a manageability engine, an out-of-band processor, a TPM, or other security engine device or collection of devices. Further, in some embodiments, the security engine 418 is also capable of communicating using the I/O subsystem 408 or a dedicated communication circuit independently of the state of the authority center server 402 (e.g., independently of the state of the processor 404), also known as "out-of-band" (OOB) communication.

The peripheral device(s) 420 may include any type of device that is usable to input information into the authority center server 402 and/or receive information from the authority center server 402. The peripheral devices 420 may be embodied as any auxiliary device usable to input information into the authority center server 402, such as a keyboard, a mouse, a microphone, a barcode reader, an image scanner, etc. or output information from the authority center server 402, such as a display, a speaker, graphics circuitry, a printer, a projector, etc. It should be appreciated that, in some embodiments, one or more of the peripheral devices 420 may function as both an input device and an output device (e.g., a touchscreen display, a digitizer on top of a display screen, etc.). It should be further appreciated that the types of peripheral devices 420 connected to the authority center server 402 may depend on, for example, the type and/or intended use of the authority center server 402. Additionally or alternatively, in some embodiments, the peripheral devices 420 may include one or more ports, such as a USB port, for example, for connecting external peripheral devices to the authority center server 402.

The network 442 may be embodied as any type of wired or wireless communication network, including but not limited to a wireless local area network (WLAN), a wireless personal area network (WPAN), a cellular network (e.g., Global System for Mobile Communications (GSM), Long-Term Evolution (LTE), etc.), a telephony network, a digital subscriber line (DSL) network, a cable network, a LAN, a WAN, a global network (e.g., the Internet), or any combination thereof. It should be appreciated that, in such embodiments, the network 442 may serve as a centralized network and, in some embodiments, may be communicatively coupled to another network (e.g., the Internet). Accordingly, the network 442 may include a variety of other virtual and/or physical network computing devices (e.g., routers, switches, network hubs, servers, storage devices, compute devices, etc.), as needed to facilitate communication between the authority center server 402 and the group manager server 422, which are not shown to preserve clarity of the description.

The group manager server 422 may be embodied as any type of computation or compute device capable of performing the functions described herein, including, without limitation, a computer, a server (e.g., stand-alone, rack-mounted, blade, etc.), a network appliance (e.g., physical or virtual), a web appliance, a distributed computing system, a processor-based system, and/or a multiprocessor system. As shown in FIG. 4, the illustrative group manager server 422, similar to the illustrative authority center server 402, includes a processor 424, an input/output (I/O) subsystem 428, a memory 430, a data storage device 434, communication circuitry 436, and, in some embodiments, a security engine 438 and/or one or more peripheral devices 440. Accordingly, the similar and/or like components are not described herein to preserve clarity of the description, with the understanding that the description of the corresponding components provided above in regard to the authority center server 402 applies equally to the corresponding components of the group manager server 422. Of course, in other embodiments, the group manager server 422 may include alternative and/or additional components, such as those commonly found in a computing device (e.g., a graphics processing unit (GPU), a power supply, fans, etc.). Additionally, in some embodiments, one or more of the illustrative components may be incorporated in, or otherwise form a portion of, another component. For example, the memory 430, or portions thereof, may be incorporated into the processor 424, in some embodiments. Further, in some embodiments, one or more of the illustrative components may be omitted from the group manager server 422.

The illustrative system 400 includes group of IoT devices, designated as an IoT device group 448. It should be appreciated that a group may include multiple IoT devices 350 or multiple group manager servers 422 (see, e.g., the group 1104 of group manager servers 1106, 1108 of FIG. 11). The illustrative IoT device group 448 includes a first IoT device 350, designated as IoT device (1) 350a, a second IoT device 350, designated as IoT device (2) 350b, and a third IoT device 350, designated as IoT device (N) 350c. It should be appreciated that the IoT device (N) 350c represents the "Nth" IoT device 350 wherein "N" is a positive integer. Each of the IoT devices 350a, 350b, 350c may be communicatively coupled at a given point in time to the authority center server 402 via an offline network 444 or other offline communication medium. Additionally, each of the IoT devices 350a, 350b, 350c may be communicatively coupled to the group manager server 422 via an online network 446. It should be appreciated that, in some embodiments, the online network 446 may be similar to the network 442 (e.g., a series of network computing devices (not shown) communicatively coupling the IoT devices 350a, 350b, 350c to the group manager server 422).

It should be appreciate that, while not illustratively shown, the IoT devices 350a, 350b, 350c may be communicatively coupled over an IoT network, which may be embodied as, or otherwise include, a wired or wireless LAN, a wired or wireless WAN, a low power wide area network (LPWAN) such as LoRaWAN™, SIGFOX, etc., a controller-area network, a cellular network, and/or a publicly-accessible, global network such as the Internet. As such, the IoT network may include any number of additional devices, such as additional compute and/or storage devices, access points, routers, switches, and hubs as may be necessary to facilitate the transmission of communications across the IoT network.

Figure 5:
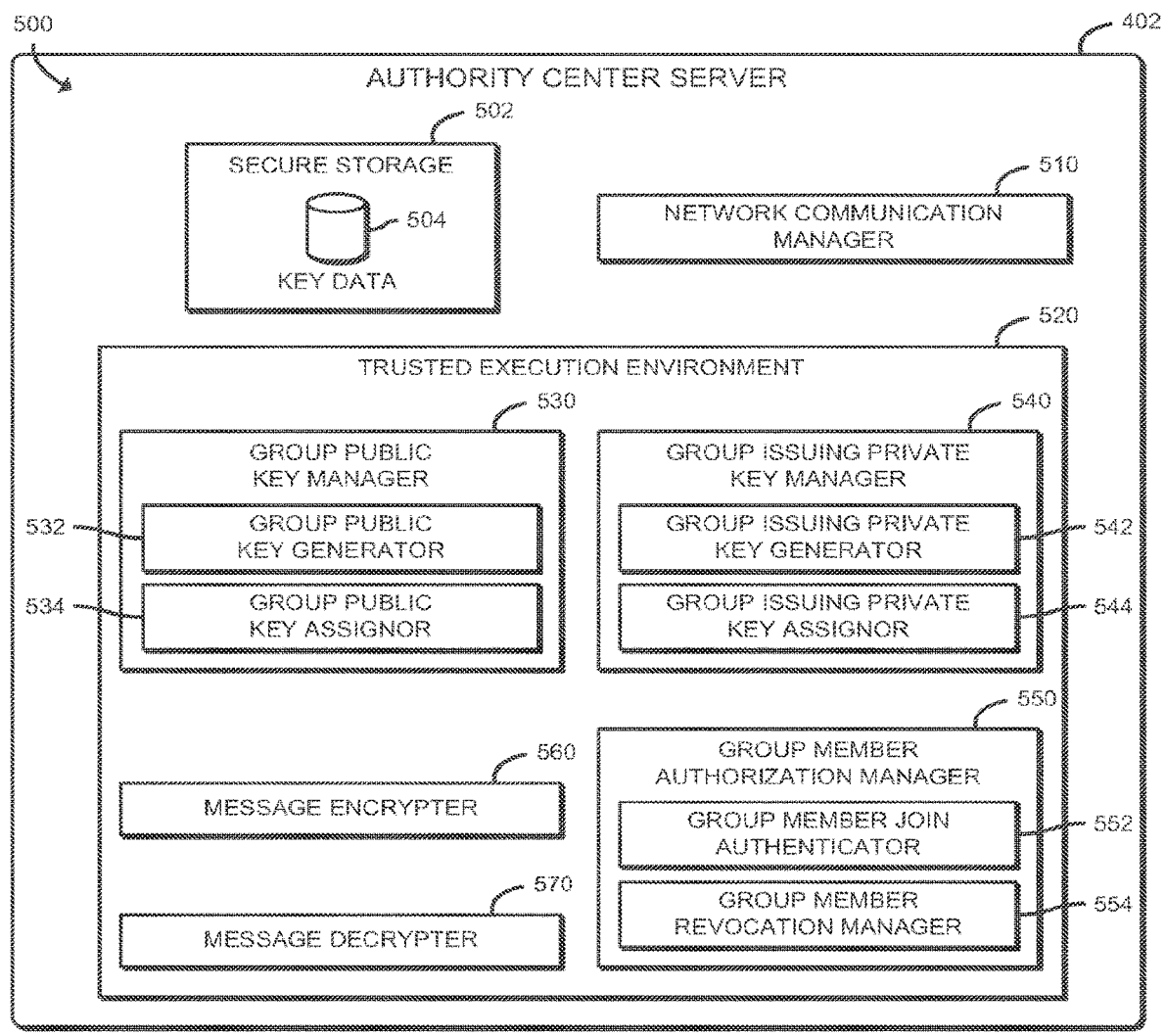
FIG. 5 is a simplified block diagram of at least one embodiment of an environment of the authority center server of the system of FIG. 4.

Referring now to FIG. 5, in use, the authority center server 402 establishes an illustrative environment 500 during operation. The illustrative environment 500 includes a network communication manager 510, a group public key manager 530, a group issuing private key manager 540, a group member authorization manager 550, a message encrypter 560, and a message decrypter 570. The various components of the environment 500 may be embodied as hardware, firmware, software, or a combination thereof. As such, in some embodiments, one or more of the components of the environment 500 may be embodied as circuitry or collection of electrical devices (e.g., network communication management circuitry 510, group public key management circuitry 530, group issuing private key management circuitry 540, group member authorization management circuitry 550, message encryption circuitry 560, message decryption circuitry 570, etc.).

It should be appreciated that, in some embodiments, one or more of the illustrative components may form a portion of another component and/or one or more of the illustrative components may be independent of one another. Further, in some embodiments, one or more of the components of the environment 500 may be embodied as virtualized hardware components or emulated architecture, which may be established and maintained by the processor 404, the communication circuitry 416, or other component(s) of the authority center server 402. It should be appreciated that the authority center server 402 may include other components, sub-components, modules, sub-modules, logic, sub-logic, and/or devices commonly found in a computing device, which are not illustrated in FIG. 5 for clarity of the description.

In the illustrative environment 500, the authority center server 402 additionally includes a secure storage 502 for storing key data 504 (e.g., the symmetric private keys). It should be appreciated that one or more of the network communication manager 510, the group public key manager 530, the group issuing private key manager 540, the group member authorization manager 550, the message encrypter 560, and the message decrypter 570 may have access to the secure storage 502. As illustratively shown, each of the group public key manager 530, the group issuing private key manager 540, the group member authorization manager 550, the message encrypter 560, and the message decrypter 570 are executed in a trusted execution environment (TEE) 520. In some embodiments, the TEE 520 may be an SGX secure enclave including user-level (e.g., ring-3) code protected with the secure enclave support 406 of the processor 404. In other embodiments, the TEE 520 may be embodied as any trusted application or other trusted component of the authority center server 402.

The network communication manager 510, which may be embodied as hardware, firmware, software, virtualized hardware, emulated architecture, and/or a combination thereof as discussed above, is configured to receive inbound and route/transmit outbound network traffic. Accordingly, the network communication manager 510 is configured to facilitate the receipt of inbound network communications (e.g., network traffic, network packets, network flows, etc.) to the authority center server 402 by managing (e.g., creating, modifying, deleting, etc.) connections to physical and virtual network ports (i.e., virtual network interfaces) of the authority center server 402 (e.g., via the communication circuitry 416), as well as the ingress buffers/queues associated therewith.

Additionally, the network communication manager 510 is configured to facilitate the transmission of outbound network communications (e.g., network traffic, network packet streams, network flows, etc.) from the authority center server 402 by managing (e.g., creating, modifying, deleting, etc.) connections to physical and virtual network ports/interfaces of the authority center server 402 (e.g., via the communication circuitry 416), as well as the egress buffers/queues associated therewith. Further, the network communication manager 510 is configured to packetize or otherwise construct/add the appropriate headers at the applicable layers to the network packet, encapsulate the payload and any footers (e.g., cyclic redundancy check (CRC) data verification information).

The group public key manager 530, which may be embodied as hardware, firmware, software, virtualized hardware, emulated architecture, and/or a combination thereof as discussed above, is configured to manage the group public keys which are to be assigned to group manager servers (e.g., the group manager server 422 of FIG. 4). To do so, the illustrative group public key manager 530 includes a group public key generator 532 configured to generate the group public keys and a group public key assignor 534 configured to assign the group public keys to the appropriate group manager servers upon request. The group public key manager 530 may be configured to store the group public keys in the key data 504, in some embodiments.

The group issuing private key manager 540, which may be embodied as hardware, firmware, software, virtualized hardware, emulated architecture, and/or a combination thereof as discussed above, is configured to manage the group issuing private keys which are to be assigned to group manager servers (e.g., the group manager server 422 of FIG. 4). To do so, the illustrative group issuing private key manager 540 includes a group issuing private key generator 542 configured to generate the group issuing private keys and a group issuing private key assignor 544 configured to assign the group issuing private keys to the appropriate group manager servers upon request. The group issuing private key manager 540 may be configured to store the group issuing private keys in the key data 504, in some embodiments.

The group member authorization manager 550, which may be embodied as hardware, firmware, software, virtualized hardware, emulated architecture, and/or a combination thereof as discussed above, is configured to manage the offline authentication phase for each IoT device 350 prior to their joining a group (e.g., the illustrative IoT device group 448 of FIG. 4). In other words, the group member authorization manager 550 is configured to manage the group members (e.g., an IoT device 350 or a group manager server 422). For example, the group member authorization manager 550 is configured to manage authorization (e.g., as an enhanced privacy identifier (EPID) authority) of IoT devices 350 during the offline authentication phase (see, e.g., the method 800 of FIG. 8). To do so, the illustrative group member authorization manager 550 includes a group member join authenticator 552, which is configured to generate (i.e., as a function of the group issuing private keys generated by the group issuing private key manager 540) and assign corresponding group member private keys to the requesting IoT devices 350.

Additionally, the group member authorization manager 550 is configured to manager revocation of private keys. To do so, the illustrative group member authorization manager 550 includes a group member revocation manager 554 which is configured to perform the applicable revocation process when a group member private key is published. For example, the group member revocation manager 554 may be configured to perform a private key based revocation, a signature based revocation, and/or a group based revocation, depending on the embodiment. In other words, the group member revocation manager 554 may be configured to revoke the group member private key, the signature, or both.

The message encrypter 560, which may be embodied as hardware, firmware, software, virtualized hardware, emulated architecture, and/or a combination thereof as discussed above, is configured to apply the applicable public and/or private keys to encrypt messages (i.e., convert from plaintext to ciphertext) based on the intended recipient. To do so, it should be appreciated that the message encrypter 560 may use one or more public and/or private keys of the key data 504 in secure storage 502 to perform the encryption.

The message decrypter 560, which may be embodied as hardware, firmware, software, virtualized hardware, emulated architecture, and/or a combination thereof as discussed above, is configured to apply the applicable public and/or private keys to decrypt messages (i.e., convert from ciphertext to plaintext) based on the device from which the encrypted message was received. To do so, it should be appreciated that the message decrypter 560 may use one or more public and/or private keys of the key data 504 in secure storage 502 to perform the decryption. Additionally, the message decrypter 560 may be configured to verify a signature of device from which the encrypted message was received.

Figure 6:
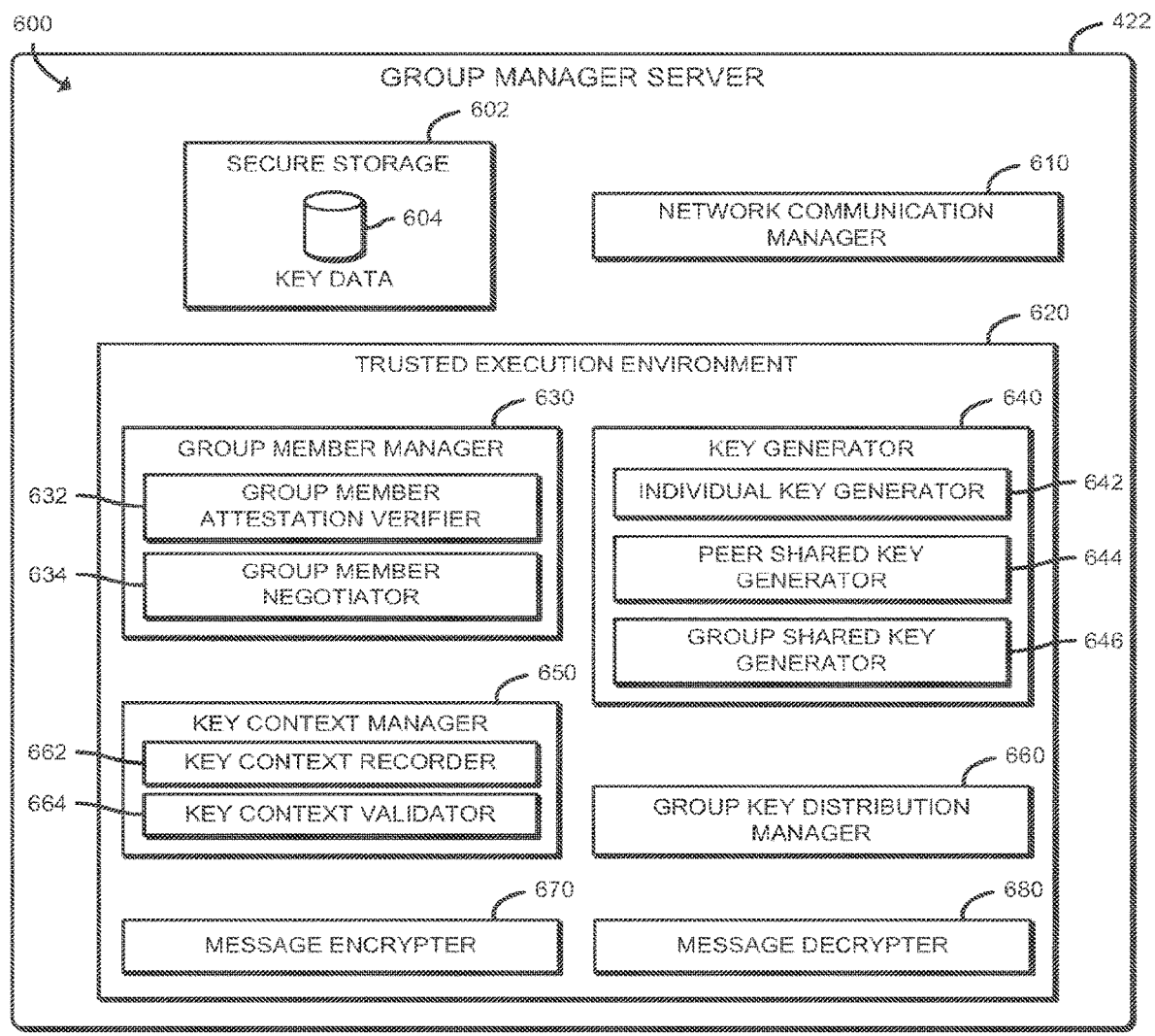
FIG. 6 is a simplified block diagram of at least one embodiment of an environment of the group manager server of the system of FIG. 4.

Referring now to FIG. 6, in use, the group manager server 422 establishes an illustrative environment 600 during operation. The illustrative environment 600 includes a network communication manager 610, a group member manager 630, a key generator 640, a context manager 650, a group key distribution manager 660, a message encrypter 670, and a message decrypter 680. The various components of the environment 600 may be embodied as hardware, firmware, software, or a combination thereof. As such, in some embodiments, one or more of the components of the environment 600 may be embodied as circuitry or collection of electrical devices (e.g., network communication management circuitry 610, group member management circuitry 630, key generation circuitry 640, context management circuitry 650, a group key distribution manager 660, message encryption circuitry 670, message decryption circuitry 680, etc.).

It should be appreciated that, in some embodiments, one or more of the illustrative components may form a portion of another component and/or one or more of the illustrative components may be independent of one another. Further, in some embodiments, one or more of the components of the environment 600 may be embodied as virtualized hardware components or emulated architecture, which may be established and maintained by the processor 424, the communication circuitry 436, or other component(s) of the group manager server 422. It should be appreciated that the group manager server 422 may include other components, sub-components, modules, sub-modules, logic, sub-logic, and/or devices commonly found in a computing device, which are not illustrated in FIG. 6 for clarity of the description.

In the illustrative environment 600, the group manager server 422 additionally includes a secure storage 602 for storing key data 604 (e.g., the symmetric private keys). It should be appreciated that one or more of the network communication manager 610, the group member manager 630, the key generator 640, the context manager 650, the group key distribution manager 660, the message encrypter 670, and the message decrypter 680 may have access to the secure storage 602. As illustratively shown, each of the group member manager 630, the key generator 640, the context manager 650, the group key distribution manager 660, the message encrypter 670 are executed in a trusted execution environment (TEE) 620.

In some embodiments, the TEE 620 may be an SGX secure enclave including user-level (e.g., ring-3) code protected with the secure enclave support 426 of the processor 424. In other embodiments, the TEE 620 may be embodied as any trusted application or other trusted component of the group manager server 422. It should be appreciated that symmetric keys, under certain conditions, may be infiltrated by a compromised node (e.g., a compromised IoT device 350) enabling an attack node (e.g., a compute device posing as the IoT device 350) to masquerade as a legitimate peer. However, the risk is mitigated, as the operations as described herein are performed in attested the TEE environment 620. As such, all symmetric operations are performed having a full understanding of the attestation, authentication and authorization properties of previous related asymmetric operations.

The network communication manager 610, which may be embodied as hardware, firmware, software, virtualized hardware, emulated architecture, and/or a combination thereof as discussed above, is configured to receive inbound and route/transmit outbound network traffic. Accordingly, the network communication manager 610 is configured to facilitate the receipt of inbound network communications (e.g., network traffic, network packets, network flows, etc.) to the group manager server 422 by managing (e.g., creating, modifying, deleting, etc.) connections to physical and virtual network ports (i.e., virtual network interfaces) of the group manager server 422 (e.g., via the communication circuitry 436), as well as the ingress buffers/queues associated therewith.

Additionally, the network communication manager 610 is configured to facilitate the transmission of outbound network communications (e.g., network traffic, network packet streams, network flows, etc.) from the group manager server 422 by managing (e.g., creating, modifying, deleting, etc.) connections to physical and virtual network ports/interfaces of the group manager server 422 (e.g., via the communication circuitry 436), as well as the egress buffers/queues associated therewith. Further, the network communication manager 610 is configured to packetize or otherwise construct/add the appropriate headers at the applicable layers to the network packet, encapsulate the payload and any footers (e.g., cyclic redundancy check (CRC) data verification information).

The group member manager 630, which may be embodied as hardware, firmware, software, virtualized hardware, emulated architecture, and/or a combination thereof as discussed above, is configured to manage an online-join phase of an authenticated IoT device 350 (i.e., previously authenticated by the authority center server 402). To do so, the illustrative group member manager 630 includes a group member attestation verifier 632 and a group member negotiator 634. The group member attestation verifier 632 is configured to verify a signature received from an IoT device 350, which was generated using the group member private key assigned to the IoT device 350 by the authority center server 402. To do so, the group member attestation verifier 632 is configured to verify the signature using the corresponding group public key (e.g., as may be used by the message decrypter 680 to decrypt the signature).

To manage the online-join phase, the group member manager 630 is additionally configured to negotiate a shared secret between the group manager server 422 and the respective IoT device 350. To do so, the illustrative group member manager 630 includes a group member negotiator 634, which is configured to manage the negotiation of the shared secret. Accordingly, the group member negotiator 634 may be configured to use one or more protocols to secure a communication channel and perform the negotiation, such as Diffie-Hellman, SIGMA, or the like.

The key generator 640 is configured to generate, or otherwise derive, the various keys employed (e.g., used, assigned, distributed, etc.) by the group manager server 422. To do so, the illustrative key generator 640 includes an individual key generator 642, a peer shared key generator 644, and a group shared key generator 646. As described previously, the group manager server 422 (e.g., via the group member manager 630) is configured to perform a negotiation to establish a shared secret with an IoT device 350. Upon having established the shared secret, the key generator 640 is configured to derive an individual key for the corresponding IoT device 350. The peer shared key generator 644 is configured to generate a peer shared key usable by one IoT device 350 of a group to share a secret with only one other IoT device 350 of the same group. The group shared key generator 646 is configured to generate a group shared key usable by one IoT device 350 to share a secret with an IoT device 350 of another group or with members of the same group and another group, such as in a multicast share.

The key context manager 650 is configured to manage the key context attributes. The key context manager 650 is configured to maintain key contexts for each derived/provisioned symmetric key where all previous authentication, attestation, and authorizations attributed to respective asymmetric and symmetric keys are maintained by all peers sharing in peer-to-peer or multi-peer interactions having a shared symmetric key.

To do so, the illustrative key context manager 650 includes a key context recorder 662, which is configured to capture the key context attributes of generated keys according to key type. For example, the key context recorder 662 may capture a lifetime attribute and/or a use limitation attribute for a group key which can be usable to identify when a group key has expired and needs updated. A key context may include various relevant attributes usable to identify the data being received from a particular IoT device 350 is trustworthy. Such a key context of attestation of an IoT device 350 may include information usable to identify an attesting authority, an attestation date, trust implications, validity, a revocation status, and a derived symmetric key identifier, if applicable.

Other key contexts may include a key context for IoT device authentication, a key context for IoT device authorization, a key context for a peer shared key, a key context for a group/sub-group, or any other key context. As such, the key contexts may include any relevant attributes usable to provide context for the key/operation being captured, such as any combination of an attesting authority, an attestation date, an authentication date, an authorization date, a creation/derivation date, identities established, authorizations established, use implications, result implications, trust implications, a validity, a revocation status, a peer shared key, a group shared key, group information, and/or a derived symmetric key identifier, depending on the key context being captured. The illustrative key context manager 650 additionally includes a key context validator 664, which is configured to validate a key context (e.g., authentication context, authorization context, attestation context, etc.).

The group key distribution manager 660 is configured to manage the distribution of the derived/generated keys which have been assigned by the group manager server 422 to the appropriate IoT device 350 or other group manager server 422. To do so, the group key distribution manager 660 may be configured to establish a secure communication channel (e.g., via the network communication manager 610) usable to distributed the appropriate keys.

The message encrypter 670, which may be embodied as hardware, firmware, software, virtualized hardware, emulated architecture, and/or a combination thereof as discussed above, is configured to apply the applicable public and/or private keys to encrypt messages (i.e., convert from plaintext to ciphertext) based on the intended recipient. To do so, it should be appreciated that the message encrypter 670 may use one or more public and/or private keys of the key data 604 in a secure storage 602 to perform the encryption.

The message decrypter 680, which may be embodied as hardware, firmware, software, virtualized hardware, emulated architecture, and/or a combination thereof as discussed above, is configured to apply the applicable public and/or private keys to decrypt messages (i.e., convert from ciphertext to plaintext) based on the device from which the encrypted message was received. To do so, it should be appreciated that the message decrypter 680 may use one or more public and/or private keys of the key data 604 in the secure storage 602 to perform the decryption. Additionally, the message decrypter 680 may be configured to verify a signature of device from which the encrypted message was received.

Figure 7:
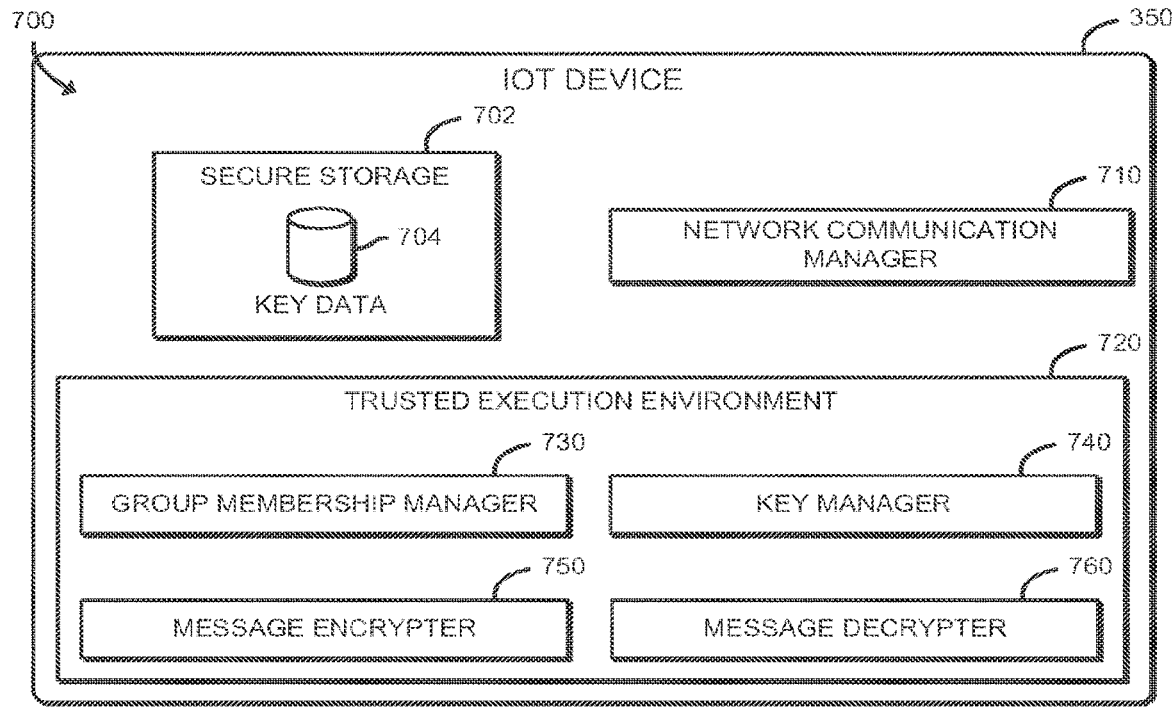
FIG. 7 is a simplified block diagram of at least one embodiment of an environment of at least one of the IoT devices of the system of FIG. 4.

Referring now to FIG. 7, in use, the IoT device 350 establishes an illustrative environment 700 during operation. The illustrative environment 700 includes a network communication manager 710, a group membership manager 730, a key manager 740, a message encrypter 750, and a message decrypter 760. The various components of the environment 700 may be embodied as hardware, firmware, software, or a combination thereof. As such, in some embodiments, one or more of the components of the environment 700 may be embodied as circuitry or collection of electrical devices (e.g., network communication management circuitry 710, group membership management circuitry 730, key management circuitry 740, message encryption circuitry 750, message decryption circuitry 760, etc.).

It should be appreciated that, in some embodiments, one or more of the illustrative components may form a portion of another component and/or one or more of the illustrative components may be independent of one another. Further, in some embodiments, one or more of the components of the environment 700 may be embodied as virtualized hardware components or emulated architecture, which may be established and maintained by the processor 352, the network interface 368, or other component(s) of the IoT device 350. It should be appreciated that the IoT device 350 may include other components, sub-components, modules, sub-modules, logic, sub-logic, and/or devices commonly found in a sensor enabled computing device, which are not illustrated in FIG. 7 for clarity of the description.

In the illustrative environment 700, the IoT device 350 additionally includes a secure storage 702 for storing key data 704 (e.g., a symmetric private key). It should be appreciated that one or more of the network communication manager 710, the group membership manager 730, the key manager 740, the message encrypter 750, and the message decrypter 760 may have access to the secure storage 702. As illustratively shown, each of the group membership manager 730, the key manager 740, the message encrypter 750 are executed in a trusted execution environment (TEE) 720. In some embodiments, the TEE 720 may be an SGX secure enclave including user-level (e.g., ring-3) code protected with the secure enclave support 392 of the processor 352. In other embodiments, the TEE 720 may be embodied as any trusted application or other trusted component of the IoT device 350.

The network communication manager 710, which may be embodied as hardware, firmware, software, virtualized hardware, emulated architecture, and/or a combination thereof as discussed above, is configured to receive inbound and route/transmit outbound network traffic. Accordingly, the network communication manager 710 is configured to facilitate the receipt of inbound network communications (e.g., network traffic, network packets, network flows, etc.) to the IoT device 350 by managing (e.g., creating, modifying, deleting, etc.) connections to physical and virtual network ports (i.e., virtual network interfaces) of the IoT device 350 (e.g., via the network interface 368), as well as the ingress buffers/queues associated therewith.

Additionally, the network communication manager 710 is configured to facilitate the transmission of outbound network communications (e.g., network traffic, network packet streams, network flows, etc.) from the IoT device 350 by managing (e.g., creating, modifying, deleting, etc.) connections to physical and virtual network ports/interfaces of the IoT device 350 (e.g., via the network interface 368), as well as the egress buffers/queues associated therewith. Further, the network communication manager 710 is configured to packetize or otherwise construct/add the appropriate headers at the applicable layers to the network packet, encapsulate the payload and any footers (e.g., cyclic redundancy check (CRC) data verification information).

The group membership manager 730, which may be embodied as hardware, firmware, software, virtualized hardware, emulated architecture, and/or a combination thereof as discussed above, is configured to authenticate the IoT device 350 with an authority center (e.g., the authority center server 402 of FIG. 4) and a group manager (e.g., the group manager server 422 of FIG. 4). To do so, the IoT device 350 is configured to establish a secure offline commination channel (e.g., via the network communication manager 710) with the authority center and request a group shared key from the group manager.

The key manager 740, which may be embodied as hardware, firmware, software, virtualized hardware, emulated architecture, and/or a combination thereof as discussed above, is configured to store received keys (e.g., a group member private key, a group shared key, a peer shared key, etc.) in a secure storage location, as necessary, such as in the key data 704 of the secure storage 702.

The message encrypter 750, which may be embodied as hardware, firmware, software, virtualized hardware, emulated architecture, and/or a combination thereof as discussed above, is configured to apply the applicable public and/or private keys to encrypt messages (i.e., convert from plaintext to ciphertext) based on the intended recipient. To do so, it should be appreciated that the message encrypter 750 may use one or more public and/or private keys of the key data 704 in a secure storage 702 to perform the encryption.

The message decrypter 760, which may be embodied as hardware, firmware, software, virtualized hardware, emulated architecture, and/or a combination thereof as discussed above, is configured to apply the applicable public and/or private keys to decrypt messages (i.e., convert from ciphertext to plaintext) based on the device from which the encrypted message was received. To do so, it should be appreciated that the message decrypter 760 may use one or more public and/or private keys of the key data 704 in the secure storage 702 to perform the decryption. Additionally, the message decrypter 760 may be configured to verify a signature of device from which the encrypted message was received.

Figure 8:
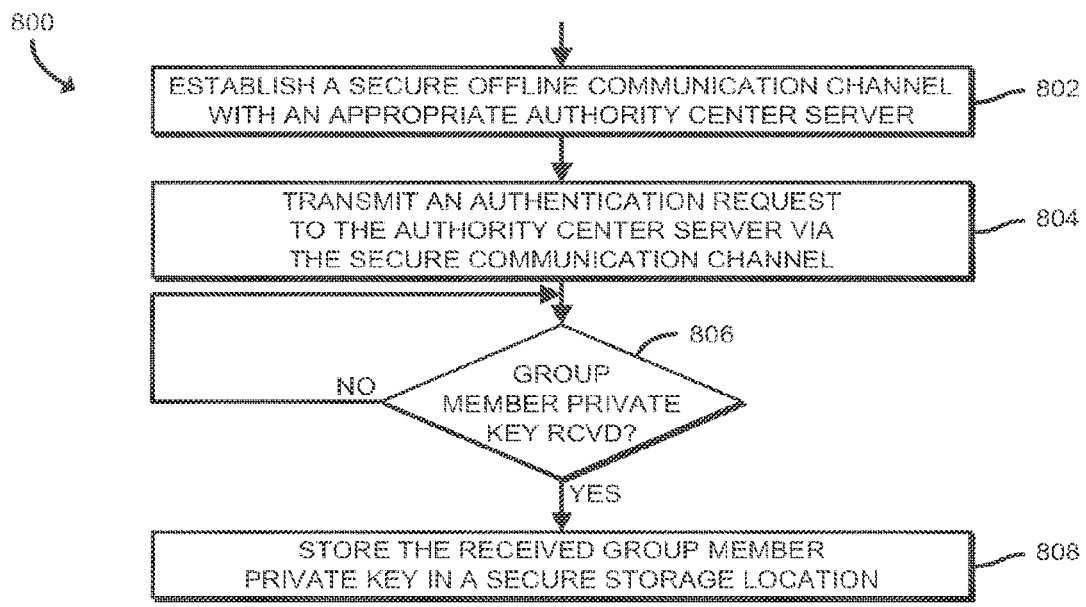
FIG. 8 is a simplified flow diagram of at least one embodiment of a method for performing an offline authentication phase that may be executed by the IoT device of FIGS. 4 and 7.

Referring now to FIG. 8, a method 800 for performing an offline authentication phase between an authority center (e.g., the illustrative authority center server 402 of FIG. 4) and an IoT device (e.g., the illustrative IoT device 350 of FIG. 3) is shown which may be executed by the IoT device 350. The method 800 begins in block 802, in which the IoT device 350 establishes a secure offline communication channel with the authority center server 402. It should be appreciated that the authority center server 402 is an offline trusted environment maintained by an owner or manager of the IoT devices 350 being authenticated. In block 804, the IoT device 350 transmits an authentication request to the authority center server 402 via the established secure offline communication channel, such that, upon receipt, the authority center server 402 can assign a group member private key to the IoT device 350 offline. It should be appreciated that, with the group member private key, the IoT device 350 may then generate a credential usable to negotiate and setup a secure channel online with a group manager (e.g., the illustrative group manager server 422 of FIG. 4). As such, the need for a pre-shared secret can be avoided, which can provide more flexibility in headless environments and potentially prevent a malicious device that is unauthenticated from joining an online group to retrieve secret data of the authenticated IoT devices 350.

In block 806, the IoT device 350 determines whether group member private key has been received from the authority center server 402. In some embodiments, the authority center server 402 may be an EPID authority, instead of traditional public key cryptography, which can result in private key operations being performed at lower computing costs. Accordingly, in such embodiments, the group member private key may be an EPID member private key usable to show a proof-of-possession of the credential to a group manager and setup a secure channel using the credential. If the IoT device 350 has received the group member private key, the method 800 advances to block 808, in which the IoT device 350 stores the received group member private key in a secure storage location (e.g., the secure storage 702 of the illustrative IoT device 350 of FIG. 7).

Figure 9:
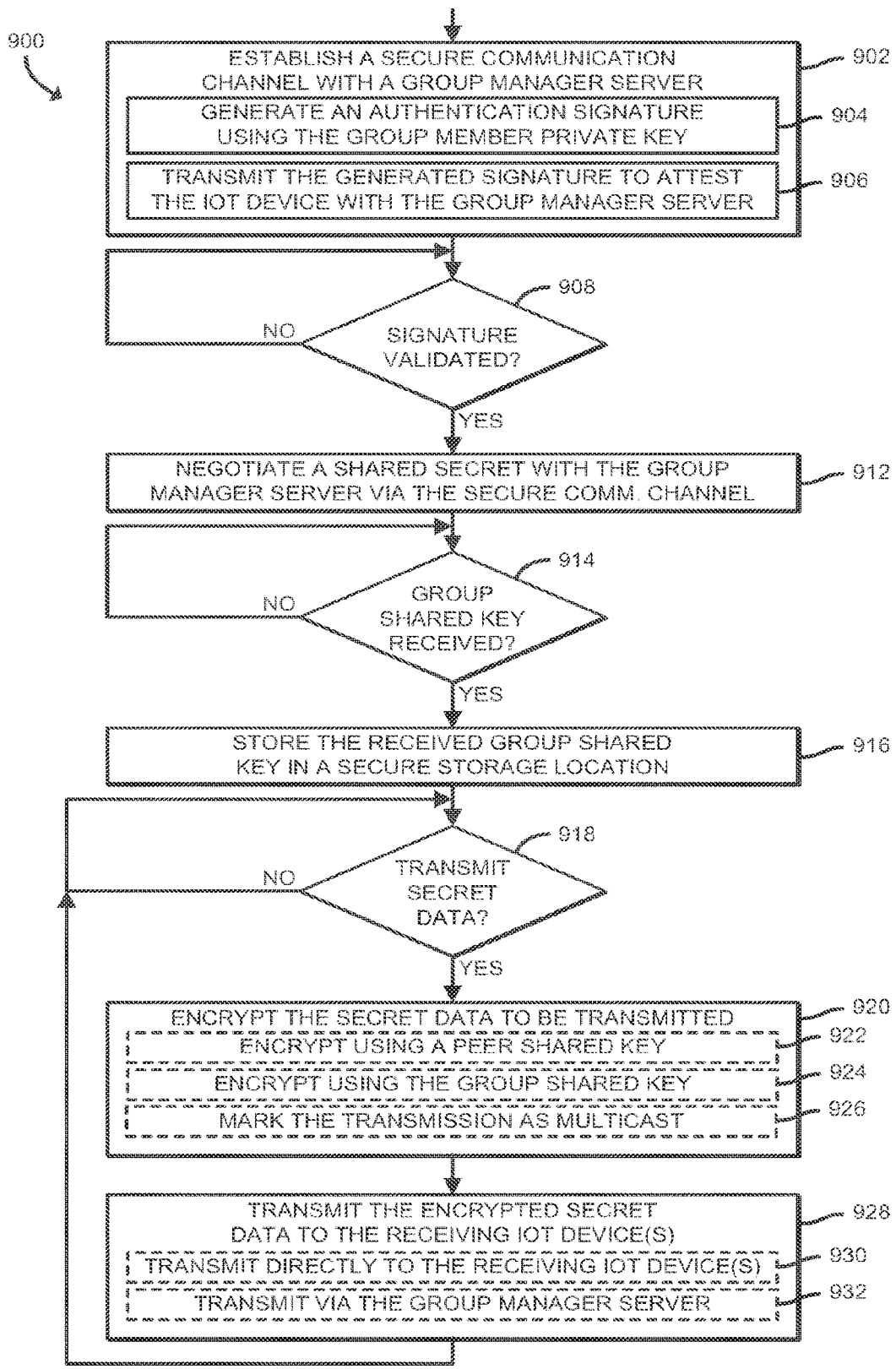
FIG. 9 is a simplified flow diagram of at least one embodiment of a method for performing an online group joining phase that may be executed by the IoT device of FIGS. 4 and 7.

Referring now to FIG. 9, a method 900 for performing an online group joining phase between an IoT device (e.g., the illustrative IoT device 350 of FIG. 3) and a group manager (e.g., the illustrative group manager server 422 of FIG. 4) is shown which may be executed by the IoT device 350. The method 900 begins in block 902, in which the IoT device 350 establishes a secure communication channel with the group manager server 422 using one or more protocols establish the secure communication to perform the negotiation, such as Diffie-Hellman, SIGMA, or the like. To do so, in block 904, the IoT device 350 generates an authentication signature using a group member private key previously received during an offline authentication phase with an authority center (e.g., the illustrative authority center server 402 of FIG. 4), as described previously in the method 800 of FIG. 8. Additionally, the IoT device 350 transmits the generated signature to attest the IoT device 350 with the group manager server 422.

In block 908, the IoT device 350 determines whether the signature has been validated by the group manager server 422. If so, the method 900 advances to block 912, in which the IoT device 350 negotiates a shared secret with the group manager server 422 via the secure communication channel. In block 914, the IoT device 350 determines whether a group shared key has been received from the group manager server 422 indicating the shared secret negotiation was successful. If so, the method 900 advances to block 916, in which the IoT device 350 stores the received group shared key in a secure storage location (e.g., the secure storage 702 of the illustrative IoT device 350 of FIG. 7).

In block 918, the IoT device 350 determines whether to transmit secret data to another one or more IoT devices 350 (e.g., in the same group or in another group). If so, the method 900 advances to block 920, in which the IoT device 350 encrypts the secret data to be transmitted using the appropriate shared key. For example, in block 922, the IoT device 350 may encrypt the secret data using a peer shared key if the receiving IoT device 350 is in the same group as the IoT device 350 transmitting the secret data. It should be appreciated that if the IoT device 350 does not already have a peer shared key for sharing secrets with the intended IoT device 350, the IoT device 350 may request the peer shared key from the group manager server 422 by reaching a peer-to-peer key agreement with the group manager server 422 using the individual key assigned to the IoT device 350 to authenticate itself to the group manager server 422. Otherwise, in block 924, if the receiving IoT device 350 is in another group, the IoT device 350 may encrypt the secret data using the group shared key. Additionally, in some embodiments, in block 926, the IoT device 350 may mark the transmission as a multicast transmission and provide an indication as to which other IoT devices 350 are to receive the encrypted secret data.

In block 928, the IoT device 350 transmits the encrypted secret data to the receiving IoT device(s) 350. To do so, in block 930, the IoT device 350 may transmit the encrypted secret data (i.e., encrypted using the peer shared key) directly to the receiving IoT device(s). Additionally or alternatively, in block 932, the IoT device 350 transmits the encrypted secret data (i.e., encrypted using the group shared key) to the group manager server 422.

Figure 10:
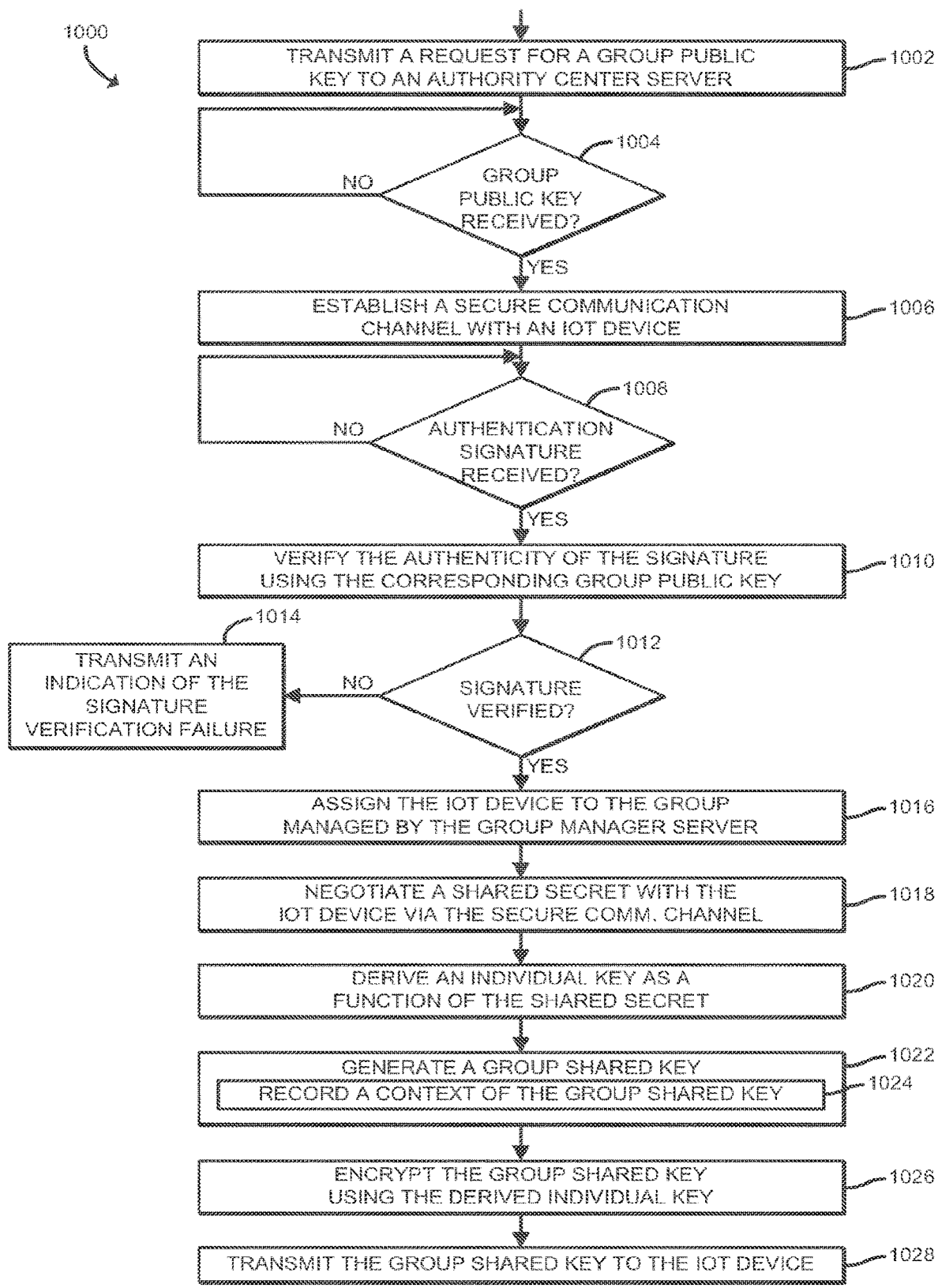
FIG. 10 is a simplified flow diagram of at least one embodiment of a method for managing an online group joining phase that may be executed by the group manager server of FIGS. 4 and 6.

Referring now to FIG. 10, a method 1000 for managing an online group joining phase between an IoT device (e.g., the illustrative IoT device 350 of FIG. 3) and a group manager (e.g., the illustrative group manager server 422 of FIG. 4) is shown which may be executed by the group manager server 422. The method 1000 begins in block 1002, in which the group manager server 422 transmits a request for a group public key to an authority center (e.g., the illustrative authority center server 402 of FIG. 4). In block 1004, the group manager server 422 determines whether the requested group public key has been received. If so, the method 1000 advances to block 1006, in which the group manager server 422 establishes a secure communication channel with an IoT device 350 requesting to be authenticated to join the group managed by the group manager server 422.

In block 1008, the group manager server 422 determines whether an authentication signature (i.e., generated by the IoT device 350 using the group member private key assigned by the authority center) has been. If the authentication signature has been received, the method 1000 advances to block 1010, in which the group manager server 422 verifies the authenticity of the signature using the corresponding group public key received from the authority center server 402. In block 1012, the group manager server 422 determines whether the signature has been verified. If not, the method 1000 branches to block 1014, in which the group manager server 422 transmits an indication of the signature verification failure to the IoT device 350; otherwise, the method 1000 branches to block 1016.

In block 1016, the group manager server 422 assigns the IoT device to the group managed by the group manager server 422. In block 1018, the group manager server 422 negotiates a shared secret with the IoT device via the secure communication channel using a key management protocol, such as Diffie-Hellman, SIGMA, etc. In block 1020, the group manager server 422 derives an individual key as a function of the shared key. In block 1022, the group manager server 422 generates a group shared key for the IoT device 350. Additionally, in block 1024, the group manager server 422 records a key context of the group shared key. In block 1026, the group manager server 422 encrypts the group shared key using the derived individual key(s). In block 1028, the group manager server 422 transmits the group shared key to each IoT device 350 of the group, including the requesting IoT device 350. It should be appreciated that if the group already includes other IoT devices, the group manager server 422 is additionally configured to encrypt the group shared key as a function of a previous group shared key and transmit the group shared key encrypted using the previous group shared key to the other IoT devices 350 of the group.

Figure 11:
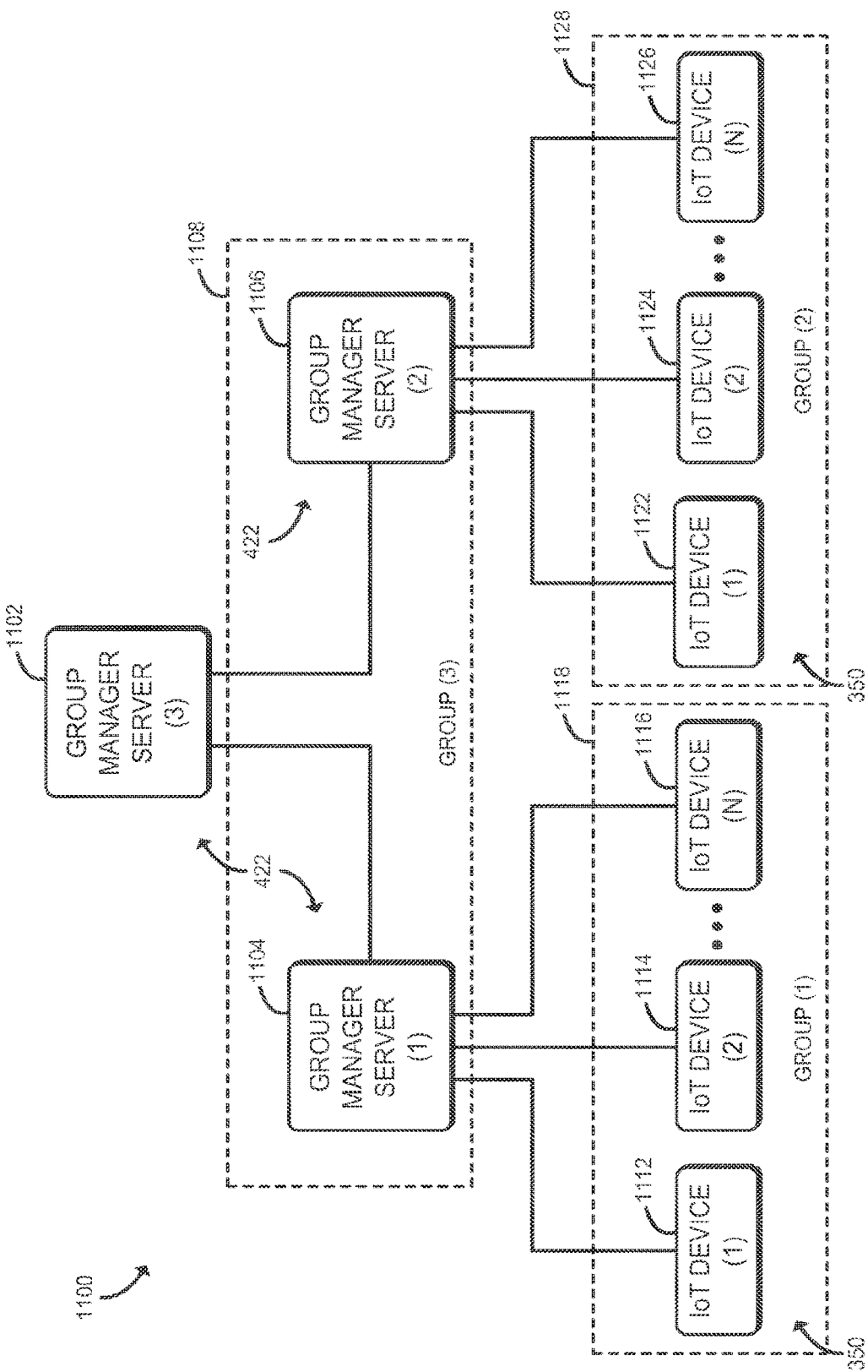
FIG. 11 is a simplified block diagram of at least one embodiment of a hierarchy of groups for key management for IoT devices that includes a group hierarchy.

Referring now to FIG. 11, an illustrative hierarchy of groups for key management for IoT devices which includes multiple group manager servers (e.g., multiple instances of the illustrative group manager server 422 of FIG. 4) and multiple IoT devices (e.g., multiple instances of the IoT devices 350 of FIG. 3). The multiple group manager servers illustratively include a first group manager server 422, designated as group manager server (1) 1104, a second group manager server 422, designated as group manager server (2) 1106, and a third group manager server 422, designated as group manager server (3) 1102. As illustratively shown, the group manager server (1) 1104 and the group manager server (2) 1106 form a hierarchical group, designated as group (3) 1108, which is managed by the group manager server (3) 1102. While only a single-level hierarchy of group manager servers 422 is shown, it should be appreciated that additional levels of group hierarchy may be supported as a function of the operations described herein, in other embodiments.

The multiple IoT devices 350 are illustratively shown in a first group of IoT devices 350 designated as group (1) 1118, which is managed by the group manager server (1) 1104, and a second group of IoT devices 350 designated as group (2) 1128, which is managed by the group manager server (2) 1106. The illustrative group (1) 1118 includes a first IoT device, designated as IoT device (1) 1112, a second IoT device, designated as IoT device (2) 1114, and a third IoT device, designated as IoT device (N) 1116. It should be appreciated that the IoT device (N) 1116 represents the "Nth" IoT device 350 of the group (1) 1118 and "N" is a positive integer. Similarly, the illustrative group (2) 1128 includes a first IoT device, designated as IoT device (1) 1122, a second IoT device, designated as IoT device (2) 1124, and a third IoT device, designated as IoT device (N) 1126. It should be appreciated that the IoT device (N) 1126 represents the "Nth" IoT device 350 of the group (2) 1128 and "N" is a positive integer.

As described previously, each group manager server 422 generates and assigns the group shared keys for the group managed by the respective group manager server 422. Accordingly, each IoT device 350 or group manager server 422 of a respective group shares the group shared key. In an illustrative example, each of the IoT devices 1112, 1114, 1116 of the group (1) 1118 share a group shared key assigned by the group manager server (1) 1104, while each of the IoT devices 1122, 1124, 1116 of the group (2) 1128 share another group key assigned by the group manager server (2) 1106. The group manager server (1) 1104 securely stores the group shared key of the group (1) 1118 and the group manager server (2) 1106 securely stores the group shared key of the group (2) 1128. Additionally, because the group manager server (1) 1104 and the group manager server (2) 1106 are in group (3) 1108 managed by the group manager server (3) 1102, the group manager server (1) 1104 and the group manager server (2) 1106 also include the group shared key of the group (3) 1108.

As such, an IoT device 350 of one group (e.g., the group (1) 1118) can communicate with another IoT device 350 of another group (e.g., the group (2) 1128). To do so, in an illustrative example in which the IoT device (1) 1112 of the group (1) 1118 wants to communicate with the IoT device (2) 1114 of the group (2) 1128, the IoT device (1) 1112 will first encrypt the secret data using the group shared key and send the cipher text to the group manager server (1) 1104. Upon receipt of the cipher text, the group manager server (1) 1104 is configured to perform a lookup operation (e.g., on a route table) to determine whether the group manager server (1) 1104 is in the same group as the other group manager server (2) 1106 (i.e., whether the manager server (1) 1104 can access the group shared key of the group manager server (2) 1106). If so, the group manager server (1) 1104 decrypts the cipher text using the group shared key of group (1) 1118 to retrieve the secret data, re-encrypts the secret data using the group shared key of the group (3) 1108, and transmits the cipher text to the group manager server (2) 1106. Upon receipt of the cipher text, the group manager server (2) 1106 is configured to decrypt the cipher text using the group shared key of the group (3) 1108 to retrieve the secret data, re-encrypts the secret data using the group shared key of the group (2) 1128, and transmits the cipher text to the IoT device (2) 1114. Accordingly, the IoT device (2) 1114 is configured to retrieve the secret data by decrypting the cipher text using the group shared key of the group (2). As such, the IoT device (1) 1112 of the group (1) 1118 can share a secret with the IoT device (2) 1114 of the group (2) 1128.

Each of the IoT devices 350 of a respective group can communicate with each of the IoT devices 350 within the respective group via a peer shared key. To do so, in an illustrative example in which the IoT device (1) 1112 wants to communicate with the IoT device (2) 1114, the IoT device (1) 1112 raises a peer-to-peer key agreement to the group manager server 1104, using the assigned individual key to authenticate itself, requesting to communicate with the IoT device (2) 1114 of the group (1). Upon receipt of the request, the group manager server 1104 creates a related key context and assigns a peer shared key to both the IoT device (1) 1112 and the IoT device (2) 1114 (e.g., using fluffy protocol). As such, the IoT device (1) 1112 and the IoT device (2) 1114 are now peers and can communicate with each other securely using the peer shared key.

Further an IoT device 350 can perform multicast sharing inside of a single group of IoT devices 350 or across multiple groups of IoT devices 350. For example, the IoT device 1112 can share a secret to all of the IoT devices in the same group (i.e., IoT devices 1114, 1116 of the group (1) 1118) via multicast and/or to all of the IoT devices 350 in another group (e.g., IoT devices 1122, 1124 of the group (2) 1128) via multicast. To do so, in an illustrative example, the IoT device 1112 encrypts the secret data with the group shared key of group (1) 1118, marks the encrypted secret data as a multicast package, and transmits the multicast package to the group manager server (1), which forwards the multicast package to each of the IoT devices 1114, 1116 of the group (1) 1118 as described above and/or decrypts/encrypts the secret data of the multicast package and transmits the re-encrypted secret data to the group manager server (2) 1106 for decryption/encryption of the encrypted secret data and distribution across the group (2) 1128 as described above.

As noted previously, the group manager servers 422 (e.g., group manager server (1) 1104, group manager server (2) 1106, and group manager server (3) 1102) are also configured to maintain a regular check for the key context associated with each group shared key. Accordingly, if at any given point in time a group manager server 422 determines a context is invalid (e.g., a lifetime attribute associated with a particular one of the IoT devices 350 of the group expired), the group manager server 422 will perform key update and revocation operations.

It should be appreciated that asymmetric key based authentication, authorization, revocation, and other key lifecycle operations can occur in their entirety within the group using group shared keys as the authority and root-of-trust for all intra-group interactions. To do so, the group 'locality' enables efficient intra-group key management that has a minimum of overhead due to trust anchor management certificate path validation and revocation checking. Additionally, group membership is managed such that intra-group interactions can be minimized. For example, a connection graph may be computed that lists the set of collaborating IoT devices 350 that most often interact. It should be further appreciated that grouping based on the connection graph is not limited to IoT device 350 interactions, and may extend to social media, e-commerce, or other applications where a connection graph may be computed.

The group manager server 422 is configured to generate a new group shared key and encrypt the group shared key using the individual key for each remaining IoT device 350. In an illustrative example in which the IoT device (N) 1116 of the group (1) 1118 leaves the group (1) 1118, the group manager server (1) 1104 is configured to generate a new group shared key for the group (1) 1118 and distributed the new group shared key to the remaining IoT devices 1112, 1114. To do so, the group manager server (1) 1104 is configured to encrypt the new group shared key using the individual key of the IoT device (1) 1112 and transmit the encrypted new group shared key to the IoT device (1) 1112. The group manager server (1) 1104 is additionally configured to encrypt the new group shared key using the individual key of the IoT device (2) 1114 and transmit the encrypted new group shared key to the IoT device (2) 1114. Accordingly, the present group members can share the new group shared key.

Figure 12:
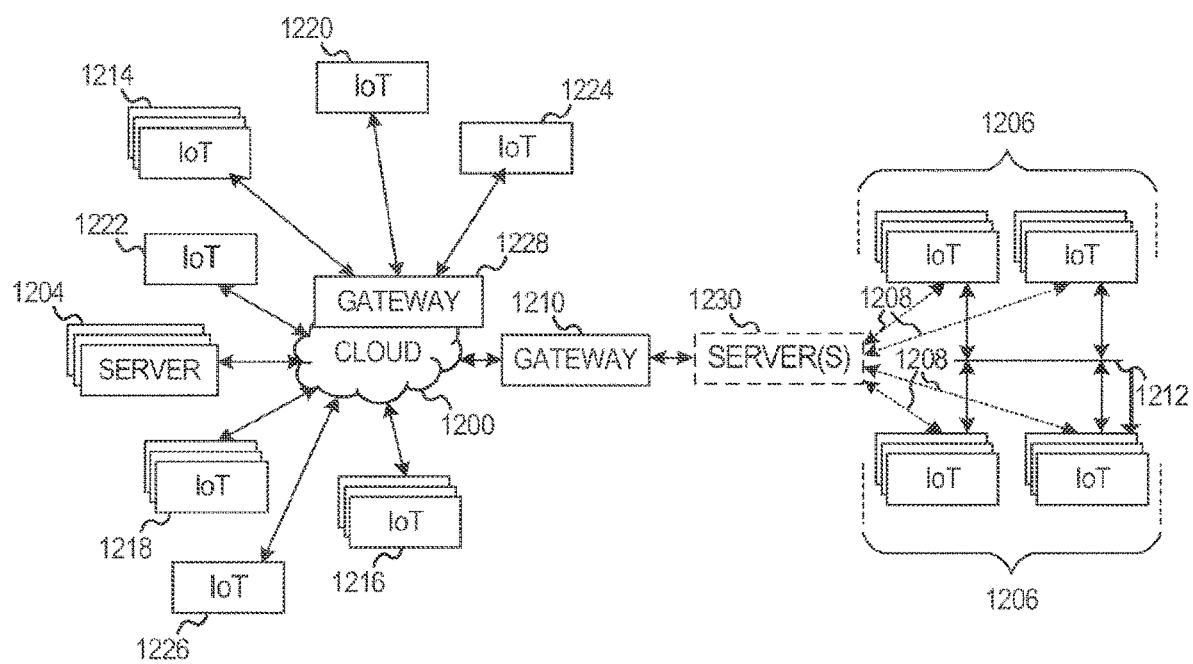
FIG. 12 is a simplified block diagram of at least one embodiment of a network illustrating communications among a number of IoT devices.

FIG. 12 illustrates a drawing of a cloud computing network, or cloud 1200, in communication with a number of Internet of Things (IoT) devices (e.g., multiple IoT devices 350). The cloud 1200 may represent the Internet, or may be a LAN, or a WAN, such as a proprietary network for a company. The IoT devices may include any number of different types of devices, grouped in various combinations. For example, a traffic control group 1206 may include IoT devices along streets in a city. These IoT devices may include stoplights, traffic flow monitors, cameras, weather sensors, and the like. The traffic control group 1206, or other subgroups, may be in communication with the cloud 1200 through wired or wireless links 1208, such as LPWA links, optical links, and the like. Further, a wired or wireless sub-network 1212 may allow the IoT devices to communicate with each other, such as through a local area network, a wireless local area network, and the like. The IoT devices may use another device, such as a gateway 1210 or 1228 to communicate with remote locations such as the cloud 1200; the IoT devices may also use one or more servers 1230 to facilitate communication with the cloud 1200 or with the gateway 1210. For example, the one or more servers 1230 may operate as an intermediate network node to support a local edge cloud or fog implementation among a local area network. Further, the gateway 1228 that is depicted may operate in a cloud-to-gateway-to-many edge devices configuration, such as with the various IoT devices 1214, 1220, 1224 being constrained or dynamic to an assignment and use of resources in the cloud 1200.

Other example groups of IoT devices may include remote weather stations 1214, local information terminals 1216, alarm systems 1218, automated teller machines 1220, alarm panels 1222, or moving vehicles, such as emergency vehicles 1224 or other vehicles 1226, among many others. Each of these IoT devices may be in communication with other IoT devices, with servers 1204, with another IoT fog device or system (not shown, but depicted in FIGS. 2 and 3), or a combination therein. The groups of IoT devices may be deployed in various residential, commercial, and industrial settings (including private and public environments).

As can be seen from FIG. 12, a large number of IoT devices may be communicating through the cloud 1200. This may allow different IoT devices to request or provide information to other devices autonomously. For example, a group of IoT devices (e.g., the traffic control group 1206) may request a current weather forecast from a group of remote weather stations 1214, which may provide the forecast without human intervention. Further, an emergency vehicle 1224 may be alerted by an automated teller machine 1220 that a burglary is in progress. As the emergency vehicle 1224 proceeds towards the automated teller machine 1220, it may access the traffic control group 1206 to request clearance to the location, for example, by lights turning red to block cross traffic at an intersection in sufficient time for the emergency vehicle 1224 to have unimpeded access to the intersection.

Clusters of IoT devices, such as the remote weather stations 1214 or the traffic control group 1206, may be equipped to communicate with other IoT devices as well as with the cloud 1200. This may allow the IoT devices to form an ad-hoc network between the devices, allowing them to function as a single device, which may be termed a fog device or system (e.g., as described above with reference to FIG. 2). It should be understood that the functional units or capabilities described in this specification may have been referred to or labeled as components or modules, in order to more particularly emphasize their implementation independence. Such components may be embodied by any number of software or hardware forms.

For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

EXAMPLES

Illustrative examples of the technologies disclosed herein are provided below. An embodiment of the technologies may include any one or more, and any combination of, the examples described below.

Example 1 includes an internet-of-things (IoT) device for key management, the IoT device comprising one or more processors; and one or more data storage devices having stored therein a plurality of instructions that, when executed by the one or more processors, cause the IoT device to authenticate with an authority center server via an offline communication channel; receive a group member private key as a function of the authentication with the authority center server; authenticate with a group management server via a secure online communication channel using the group member private key; receive a group shared key as a function of the authentication with the group management server; encrypt secret data with the group shared key; and transmit the encrypted secret data to the group management server.

Example 2 includes the subject matter of Example 1, and wherein to authenticate with the authority center server comprises to establish the offline communication channel using a key management protocol; and transmit an authentication request to the authority center server via the offline communication channel, wherein the authentication request is usable to determine that the IoT device has requested to be assigned the group member private key.

Example 3 includes the subject matter of any of Examples 1 and 2, and wherein to authenticate with the group management server comprises to generate a credential as a function of the group member private key; and transmit the generated credential to the group manager server, wherein the generated credential is usable to attest the IoT device to the group manager server using a corresponding group public key.

Example 4 includes the subject matter of any of Examples 1-3, and wherein the credential comprises an authentication signature generated using the group member private key.

Example 5 includes the subject matter of any of Examples 1-4, and wherein to authenticate with the group management server further comprises to negotiate a shared secret with the group manager server, and wherein the shared secret is usable to derive an individual key.

Example 6 includes the subject matter of any of Examples 1-5, and wherein to receive the group shared key comprises to receive the group shared key encrypted by the group manager server using the individual key.

Example 7 includes the subject matter of any of Examples 1-6, and wherein the plurality of instructions further cause the IoT device to authenticate the IoT device to the group manager server using the individual key; transmit, subsequent to having successfully authenticated with the group manager server, a request to the group manager server requesting to communicate peer-to-peer with another IoT device of a group to which the IoT device corresponds and is managed by the group manager server; and receive a peer shared key assigned by the group manager server to the IoT device and the other IoT device.

Example 8 includes the subject matter of any of Examples 1-7, and wherein the plurality of instructions further cause the IoT device to encrypt other secret data using the peer shared key; and transmit the encrypted other secret data to the other IoT device.

Example 9 includes the subject matter of any of Examples 1-8, and wherein the plurality of instructions further cause the IoT device to mark the encrypted secret data as a multicast package prior to the transmission of the encrypted secret data to the group management server.

Example 10 includes a method for key management of internet-of-things (IoT) devices, the method comprising authenticating, by an IoT device, with an authority center server via an offline communication channel; receiving, by the IoT device, a group member private key as a function of the authentication with the authority center server; authenticating, by the IoT device, with a group management server via a secure online communication channel using the group member private key; receiving, by the IoT device, a group shared key as a function of the authentication with the group management server; encrypting, by the IoT device, secret data with the group shared key; and transmitting, by the IoT device, the encrypted secret data to the group management server.

Example 11 includes the subject matter of Example 10, and wherein authenticating with the authority center server comprises (i) establishing the offline communication channel using a key management protocol and (ii) transmitting an authentication request to the authority center server via the offline communication channel, wherein the authentication request is usable to determine that the IoT device is requesting to be assigned the group member private key.

Example 12 includes the subject matter of any of Examples 10 and 11, and wherein authenticating with the group management server comprises (i) generating a credential as a function of the group member private key and (ii) transmitting the generated credential to the group manager server, wherein the generated credential is usable to attest the IoT device to the group manager server using a corresponding group public key.

Example 13 includes the subject matter of any of Examples 10-12, and wherein the credential comprises an authentication signature generated using the group member private key.

Example 14 includes the subject matter of any of Examples 10-13, and wherein authenticating with the group management server further comprises negotiating a shared secret with the group manager server, and wherein the shared secret is usable to derive an individual key.

Example 15 includes the subject matter of any of Examples 10-14, and wherein receiving the group shared key comprises to receive the group shared key encrypted by the group manager server using the individual key.

Example 16 includes the subject matter of any of Examples 10-15, and further including authenticating, by the IoT device, the IoT device to the group manager server using the individual key; transmitting, by the IoT device and subsequent to having successfully authenticated with the group manager server, a request to the group manager server requesting to communicate peer-to-peer with another IoT device of a group to which the IoT device corresponds and is managed by the group manager server; and receiving, by the IoT device, a peer shared key assigned by the group manager server to the IoT device and the other IoT device.

Example 17 includes the subject matter of any of Examples 10-16, and further including encrypting, by the IoT device, other secret data using the peer shared key; and transmitting, by the IoT device, the encrypted other secret data to the other IoT device.

Example 18 includes the subject matter of any of Examples 10-17, and further including marking, by the IoT device, the encrypted secret data as a multicast package prior to the transmission of the encrypted secret data to the group management server.

Example 19 includes one or more machine-readable storage media comprising a plurality of instructions stored thereon that, in response to being executed, cause an internet-of-things (IoT) device to perform the method of any of Examples 10-18.

Example 20 includes an internet-of-things (IoT) device comprising one or more sensors; one or more processors; and one or more memory devices having stored therein a plurality of instructions that, when executed by the one or more processors, cause the IoT device to perform the method of any of Examples 10-18.

Example 21 includes an internet-of-things (IoT) device for key management, the IoT device comprising group membership management circuitry to authenticate with an authority center server via an offline communication channel, receive a group member private key as a function of the authentication with the authority center server, authenticate with a group management server via a secure online communication channel using the group member private key, and receive a group shared key as a function of the authentication with the group management server; message encryption circuitry to encrypt secret data with the group shared key; and network communication management circuitry to transmit the encrypted secret data to the group management server.

Example 22 includes the subject matter of Example 21, and wherein to authenticate with the authority center server comprises to establish the offline communication channel using a key management protocol; and transmit an authentication request to the authority center server via the offline communication channel, wherein the authentication request is usable to determine that the IoT device has requested to be assigned the group member private key.

Example 23 includes the subject matter of any of Examples 21 and 22, and wherein to authenticate with the group management server comprises to generate a credential as a function of the group member private key; and transmit the generated credential to the group manager server, wherein the generated credential is usable to attest the IoT device to the group manager server using a corresponding group public key.

Example 24 includes the subject matter of any of Examples 21-23, and wherein the credential comprises an authentication signature generated using the group member private key.

Example 25 includes the subject matter of any of Examples 21-24, and wherein to authenticate with the group management server further comprises to negotiate a shared secret with the group manager server, and wherein the shared secret is usable to derive an individual key.

Example 26 includes the subject matter of any of Examples 21-25, and wherein to receive the group shared key comprises to receive the group shared key encrypted by the group manager server using the individual key.

Example 27 includes the subject matter of any of Examples 21-26, and wherein the group membership management circuitry is further to authenticate the IoT device to the group manager server using the individual key, and wherein the network communication management circuitry is further to transmit, subsequent to having successfully authenticated with the group manager server, a request to the group manager server requesting to communicate peer-to-peer with another IoT device of a group to which the IoT device corresponds and is managed by the group manager server; and receive a peer shared key assigned by the group manager server to the IoT device and the other IoT device.

Example 28 includes the subject matter of any of Examples 21-27, and wherein the plurality message encryption circuitry is further to encrypt other secret data using the peer shared key and wherein the network communication management circuitry is further to transmit the encrypted other secret data to the other IoT device.

Example 29 includes the subject matter of any of Examples 21-28, and wherein the group membership management circuitry is further to mark the encrypted secret data as a multicast package prior to the transmission of the encrypted secret data to the group management server.

Example 30 includes an internet-of-things (IoT) device for key management, the IoT device comprising means for authenticating with an authority center server via an offline communication channel, means for receiving a group member private key as a function of the authentication with the authority center server, means for authenticating with a group management server via a secure online communication channel using the group member private key, and means for receiving a group shared key as a function of the authentication with the group management server; circuitry to encrypt secret data with the group shared key; and circuitry to transmit the encrypted secret data to the group management server.

Example 31 includes the subject matter of Example 30, and wherein the means for authenticating with the authority center server comprises means for establishing the offline communication channel using a key management protocol; and circuitry to transmit an authentication request to the authority center server via the offline communication channel, wherein the authentication request is usable to determine that the IoT device has requested to be assigned the group member private key.

Example 32 includes the subject matter of any of Examples 30 and 31, and wherein the means for authenticating with the group management server comprises to means for generating a credential as a function of the group member private key; and circuitry to transmit the generated credential to the group manager server, wherein the generated credential is usable to attest the IoT device to the group manager server using a corresponding group public key.

Example 33 includes the subject matter of any of Examples 30-32, and wherein the credential comprises an authentication signature generated using the group member private key.

Example 34 includes the subject matter of any of Examples 30-33, and wherein the means for authenticating with the group management server further comprises to negotiate a shared secret with the group manager server, and wherein the shared secret is usable to derive an individual key.

Example 35 includes the subject matter of any of Examples 30-34, and wherein to receive the group shared key comprises to receive the group shared key encrypted by the group manager server using the individual key.

Example 36 includes the subject matter of any of Examples 30-35, and further including means for authenticating the IoT device to the group manager server using the individual key; circuitry to transmit, subsequent to having successfully authenticated with the group manager server, a request to the group manager server requesting to communicate peer-to-peer with another IoT device of a group to which the IoT device corresponds and is managed by the group manager server; and circuitry to receive a peer shared key assigned by the group manager server to the IoT device and the other IoT device.

Example 37 includes the subject matter of any of Examples 30-36, and further including means for encrypting other secret data using the peer shared key and wherein the network communication management circuitry is further to transmit the encrypted other secret data to the other IoT device.

Example 38 includes the subject matter of any of Examples 30-37, and further including means for marking the encrypted secret data as a multicast package prior to the transmission of the encrypted secret data to the group management server.

Example 39 includes a group manager server for key management for a plurality of IoT devices, the group manager server comprising one or more processors; and one or more data storage devices having stored therein a plurality of instructions that, when executed by the one or more processors, cause the group manager server to transmit a request for a group public key to an authority center server; receive the group public key from the authority center server; receive an authentication request from an IoT device of the plurality of IoT devices; authenticate the IoT device as a function of the authentication request; assign, subsequent to having authenticated the IoT device, the IoT device to a group of IoT devices managed by the group manager server.

Example 40 includes the subject matter of Example 39, and wherein to authenticate the IoT device comprises to establish a secure communication channel using a key management protocol; receive a credential from the IoT device via the secure communication channel; and verify the credential using the group public key.

Example 41 includes the subject matter of any of Examples 39 and 40, and wherein the credential comprises an authentication signature generated using a group member private key issued to the IoT device by the authority center server.

Example 42 includes the subject matter of any of Examples 39-41, and wherein the plurality of instructions further cause the group manager server to negotiate a shared secret with the IoT device via a secure communication channel; derive an individual key as a function of the shared secret; generate a group shared key; encrypt the group shared key using the derived individual key; and transmit the group shared key to the IoT device.

Example 43 includes the subject matter of any of Examples 39-42, and wherein to generate the group shared key includes to record a context of the group shared key.

Example 44 includes the subject matter of any of Examples 39-43, and wherein the plurality of instructions further cause the group manager server to receive an authentication request from the IoT device; authenticate the IoT device as a function of the individual key; receive a request from the IoT device requesting to communicate peer-to-peer with another IoT device of the group to which the IoT device corresponds and is managed by the group manager server; generate a peer shared key; create and store a key context; and assign the peer shared key to each of the IoT device and the other IoT device using a key management protocol.

Example 45 includes the subject matter of any of Examples 39-44, and wherein the plurality of instructions further cause the group manager server to receive a message with secret data from the IoT device, wherein the secret data has been encrypted using the group shared key, and wherein the message includes an indication that the secret data is to be transmitted to another IoT device in another group managed by another group manager server; perform a lookup operation to identify whether the group manager server has a shared key with the other group; decrypt the secret data using the group shared key; encrypt the secret data using the shared key of the other group; and transmit the encrypted secret data to the other group manager server.

Example 46 includes a method for key management for a plurality of IoT devices by a group manager server, the method comprising transmitting, by the group manager server, a request for a group public key to an authority center server; receiving, by the group manager server, the group public key from the authority center server; receiving, by the group manager server, an authentication request from an IoT device of a plurality of IoT devices; authenticating, by the group manager server, the IoT device as a function of the authentication request; assigning, by the group manager server and subsequent to having authenticated the IoT device, the IoT device to a group of IoT devices managed by the group manager server.

Example 47 includes the subject matter of Example 46, and wherein authenticating the IoT device comprises establishing a secure communication channel using a key management protocol; receiving a credential from the IoT device via the secure communication channel; and verifying the credential using the group public key.

Example 48 includes the subject matter of any of Examples 46 and 47, and wherein the credential comprises an authentication signature generated using a group member private key issued to the IoT device by the authority center server.

Example 49 includes the subject matter of any of Examples 46-48, and further including negotiating, by the group manager server, a shared secret with the IoT device via a secure communication channel; deriving, by the group manager server, an individual key as a function of the shared secret; generating, by the group manager server, a group shared key; encrypting, by the group manager server, the group shared key using the derived individual key; and transmitting, by the group manager server, the group shared key to the IoT device.

Example 50 includes the subject matter of any of Examples 46-49, and wherein generating the group shared key includes recording a context of the group shared key.

Example 51 includes the subject matter of any of Examples 46-50, and further including receiving, by the group manager server, an authentication request from the IoT device; authenticating, by the group manager server, the IoT device as a function of the individual key; receiving, by the group manager server, a request from the IoT device requesting to communicate peer-to-peer with another IoT device of the group to which the IoT device corresponds and is managed by the group manager server; generating, by the group manager server, a peer shared key; creating, by the group manager server, a key context; storing, by the group manager server, a key context; and assigning, by the group manager server, the peer shared key to each of the IoT device and the other IoT device using a key management protocol.

Example 52 includes the subject matter of any of Examples 46-51, and further including receiving, by the group manager server, a message with secret data from the IoT device, wherein the secret data has been encrypted using the group shared key, and wherein the message includes an indication that the secret data is to be transmitted to another IoT device in another group managed by another group manager server; performing, by the group manager server, a lookup operation to identify whether the group manager server has a shared key with the other group; decrypting, by the group manager server, the secret data using the group shared key; encrypting, by the group manager server, the secret data using the shared key of the other group; and transmitting, by the group manager server, the encrypted secret data to the other group manager server.

Example 53 includes one or more machine-readable storage media comprising a plurality of instructions stored thereon that, in response to being executed, cause a group manager server device to perform the method of any of Examples 46-52.

Example 54 includes a group manager server for improving throughput in a network, the group manager server comprising one or more processors; one or more memory devices having stored therein a plurality of instructions that, when executed by the one or more processors, cause the group manager server to perform the method of any of Examples 46-52.

Example 55 includes a group manager server for key management for a plurality of IoT devices, the group manager server comprising network communication management circuitry to transmit a request for a group public key to an authority center server, receive the group public key from the authority center server, receive an authentication request from an IoT device of the plurality of IoT devices; and group member management circuitry to authenticate the IoT device as a function of the authentication request, and assign, subsequent to having authenticated the IoT device, the IoT device to a group of IoT devices managed by the group manager server.

Example 56 includes the subject matter of Example 55, and wherein to authenticate the IoT device comprises to establish a secure communication channel using a key management protocol; receive a credential from the IoT device via the secure communication channel; and verify the credential using the group public key.

Example 57 includes the subject matter of any of Examples 55 and 56, and wherein the credential comprises an authentication signature generated using a group member private key issued to the IoT device by the authority center server.

Example 58 includes the subject matter of any of Examples 55-57, and wherein the group member management circuitry is further to negotiate a shared secret with the IoT device via a secure communication channel; derive an individual key as a function of the shared secret; and generate a group shared key, wherein the group manager server further comprises message encryption circuitry to encrypt the group shared key using the derived individual key, and wherein the network communication management circuitry is further to transmit the group shared key to the IoT device.

Example 59 includes the subject matter of any of Examples 55-58, and wherein to generate the group shared key includes to record a context of the group shared key.

Example 60 includes the subject matter of any of Examples 55-59, and wherein the network communication management circuitry is further to receive an authentication request from the IoT device, wherein the group member management circuitry is further to authenticate the IoT device as a function of the individual key, wherein the network communication management circuitry is further to receive a request from the IoT device requesting to communicate peer-to-peer with another IoT device of the group to which the IoT device corresponds and is managed by the group manager server, wherein the group manager server further includes key generation circuitry to generate a peer shared key, wherein the group manager server further includes key context management circuitry to create and store a key context, and wherein the group member management circuitry is further to assign the peer shared key to each of the IoT device and the other IoT device using a key management protocol.

Example 61 includes the subject matter of any of Examples 55-60, and wherein the network communication management circuitry is further to receive a message with secret data from the IoT device, wherein the secret data has been encrypted using the group shared key, and wherein the message includes an indication that the secret data is to be transmitted to another IoT device in another group managed by another group manager server, wherein the group member management circuitry is further to perform a lookup operation to identify whether the group manager server has a shared key with the other group, wherein the message encryption circuitry is further to (i) decrypt the secret data using the group shared key and (ii) encrypt the secret data using the shared key of the other group, and wherein the network communication management circuitry is further to transmit the encrypted secret data to the other group manager server.

Example 62 includes a group manager server for key management for a plurality of IoT devices, the group manager server comprising circuitry to transmit a request for a group public key to an authority center server; circuitry to receive the group public key from the authority center server; circuitry to receive an authentication request from an IoT device of the plurality of IoT devices; means for authenticating the IoT device as a function of the authentication request; means for assigning, subsequent to having authenticated the IoT device, the IoT device to a group of IoT devices managed by the group manager server.

Example 63 includes the subject matter of Example 62, and wherein to authenticate the IoT device comprises to circuitry to establish a secure communication channel using a key management protocol; circuitry to receive a credential from the IoT device via the secure communication channel; and means for verifying the credential using the group public key.

Example 64 includes the subject matter of any of Examples 62 and 63, and wherein the credential comprises an authentication signature generated using a group member private key issued to the IoT device by the authority center server.

Example 65 includes the subject matter of any of Examples 62-64, and further including means for negotiating a shared secret with the IoT device via a secure communication channel; means for deriving an individual key as a function of the shared secret; means for generating a group shared key; circuitry to encrypt the group shared key using the derived individual key; and circuitry to transmit the group shared key to the IoT device.

Example 66 includes the subject matter of any of Examples 62-65, and wherein to generate the group shared key includes to record a context of the group shared key.

Example 67 includes the subject matter of any of Examples 62-66, and further including circuitry to receive an authentication request from the IoT device; means for authenticating the IoT device as a function of the individual key; circuitry to receive a request from the IoT device requesting to communicate peer-to-peer with another IoT device of the group to which the IoT device corresponds and is managed by the group manager server; means for generating a peer shared key; means for create and storing a key context; and means for assigning the peer shared key to each of the IoT device and the other IoT device using a key management protocol.

Example 68 includes the subject matter of any of Examples 62-67, and further including circuitry to receive a message with secret data from the IoT device, wherein the secret data has been encrypted using the group shared key, and wherein the message includes an indication that the secret data is to be transmitted to another IoT device in another group managed by another group manager server; means for performing a lookup operation to identify whether the group manager server has a shared key with the other group; circuitry to decrypt the secret data using the group shared key; circuitry to encrypt the secret data using the shared key of the other group; and circuitry to transmit the encrypted secret data to the other group manager server.

The invention claimed is:

1. A group management server, the group management server comprising:
   at least one memory;
   instructions in the group management server; and
   one or more processors to execute the instructions to at least:
   authenticate a first Internet of Things (IoT) device as a member of a first group using a first group member private key assigned to the first IoT device by an authority server, the first IoT device authenticated with the authority server via a first communication channel, wherein the first communication channel is isolated from a second communication channel utilized by the first IoT device to communicate with the group management server;
   transmit a first group shared key to the first IoT device, the first group shared key generated as a function of the authentication with the authority server;
   authenticate a second IoT device as a member of a second group using a second group member private key assigned to the second IoT device by the authority server, the second IoT device authenticated with the authority server via a third communication channel, wherein the third communication channel is isolated from a fourth communication channel utilized by the second IoT device to communicate with a group management server; and transmit a second group shared key to the second IoT device, the second group shared key generated as a function of the authentication with the authority server.

2. The group management server of claim 1, wherein, to authenticate with the authority server, the first IoT device is to:

establish the first communication channel using a key management protocol; and transmit an authentication request to the authority server via the first communication channel, wherein the authentication request indicates that the first IoT device has requested assignment to the first group member private key.

3. The group management server of claim 1, wherein, to authenticate with the group management server, the first IoT device is to:

generate a credential as a function of the first group member private key; and transmit the generated credential to the group management server, wherein the generated credential attests the first IoT device to the group management server using a corresponding first group public key.

4. The group management server of claim 3, wherein the credential comprises an authentication signature generated using the first group member private key.

5. The group management server of claim 3, wherein to authenticate the first IoT device with the group management server, the one or more processors are to execute the instructions to negotiate a shared secret, and wherein an individual key is derived using the shared secret.

6. The group management server of claim 5, wherein the one or more processors are to execute the instructions to encrypt the first group shared key using the individual key.

7. The group management server of claim 5, wherein the one or more processors are to execute the instructions to:

authenticate the first IoT device using the individual key;

receive a request from the first IoT device to communicate peer-to-peer with another IoT device of a group to which the first IoT device corresponds; and transmit a peer shared key assigned to the first IoT device and the other IoT device.

8. The group management server of claim 7, wherein the first IoT device is to:

encrypt other secret data using the peer shared key; and transmit the encrypted other secret data to the other IoT device.

9. The group management server of claim 8, wherein the one or more processors are to execute the instructions to cause the first IoT device to mark the encrypted secret data as a multicast package prior to the transmission of the encrypted secret data to the group management server.

10. A method for key management of computing devices, the method comprising:

authenticating, by a computing device, with an authority center server via a first communication channel;

obtaining, by the computing device, a group member private key as a function of the authentication with the authority center server;

authenticating, by the computing device, with a group management server via a second communication channel using the group member private key, wherein the second communication channel is isolated from the first communication channel;

obtaining, by the computing device, a group shared key as a function of the authentication with the group management server;

encrypting, by the computing device, secret data with the group shared key; and transmitting, by the computing device, the encrypted secret data to the group management server.

11. The method of claim 10, wherein authenticating with the authority center server comprises (i) establishing the first communication channel using a key management protocol and (ii) transmitting an authentication request to the authority center server via the first communication channel, wherein the authentication request is usable to determine that the computing device is requesting to be assigned the group member private key.

12. The method of claim 10, wherein the first communication channel is an offline communication channel and the second communication channel is an online communication channel, and wherein authenticating with the group management server comprises (i) generating a credential as a function of the group member private key and (ii) transmitting the generated credential to the group management server, wherein the generated credential is usable to attest the computing device to the group management server using a corresponding group public key.

13. The method of claim 12, wherein the credential comprises an authentication signature generated using the group member private key.

14. The method of claim 12, wherein authenticating with the group management server further comprises negotiating a shared secret with the group management server, wherein the shared secret is usable to derive an individual key, and wherein receiving the group shared key comprises to receive the group shared key encrypted by the group management server using the individual key.

15. The method of claim 14, further comprising:

authenticating, by the computing device, an IoT computing device to the group management server using the individual key;

transmitting, by the computing device and subsequent to having successfully authenticated with the group management server, a request to the group management server requesting to communicate peer-to-peer with another computing device of a group to which the computing device corresponds and is managed by the group management server; and receiving, by the computing device, a peer shared key assigned by the group management server to the computing device and the other computing device.

16. The method of claim 15, further comprising:

encrypting, by the computing device, other secret data using the peer shared key; and transmitting, by the computing device, the encrypted other secret data to the other computing device.

17. The method of claim 10, further comprising marking, by the computing device, the encrypted secret data as a multicast package prior to the transmission of the encrypted secret data to the group management server.

18. A non-transitory computer readable medium comprising instructions that, when executed, cause a machine to at least:

authenticate a first Internet of Things (IoT) device as a member of a first group using a first group member private key assigned to the first IoT device by an authority server, the first IoT device authenticated with the authority server via a first communication channel wherein the first communication channel is isolated from a second communication channel utilized by the first IoT device to communicate with a group management server;

transmit a first group shared key to the first IoT device, the first group shared key generated as a function of the authentication with the authority server;

authenticate a second IoT device as a member of a second group using a second group member private key assigned to the second IoT device by the authority server, the second IoT device authenticated with the authority server via a third communication channel, wherein the third communication channel is isolated from a fourth communication channel utilized by the second IoT device to communicate with the group management server; and transmit a second group shared key to the second IoT device, the second group shared key generated as a function of the authentication with the authority server.

19. The non-transitory computer readable medium of claim 18, wherein the first IoT device is to establish the first communication channel using a key management protocol; and transmit an authentication request to the authority server via the first communication channel, wherein the authentication request indicates that the first IoT device has requested assignment to the first group member private key.

20. The non-transitory computer readable medium of claim 18, wherein the first IoT device is to:

generate a credential as a function of the first group member private key; and transmit the generated credential to a group management server, wherein the generated credential attests the first IoT device to the group management server using a corresponding first group public key.

21. The non-transitory computer readable medium of claim 20, wherein the credential comprises an authentication signature generated using the first group member private key.

22. The non-transitory computer readable medium of claim 20, wherein the instructions, when executed, further cause the machine to negotiate a shared secret, and wherein an individual key is derived using the shared secret.

23. The non-transitory computer readable medium of claim 22, wherein the instructions, when executed, further cause the machine to encrypt the first group shared key using the individual key.

24. The non-transitory computer readable medium of claim 22, wherein the instructions, when executed, further cause the machine to:

authenticate the first IoT device using the individual key;

receive a request from the first IoT device to communicate peer-to-peer with another IoT device of a group to which the first IoT device corresponds and is managed; and transmit a peer shared key assigned to the first IoT device and the other IoT device.

25. The non-transitory computer readable medium of claim 24, wherein the first IoT device is to:

encrypt other secret data using the peer shared key; and transmit the encrypted other secret data to the other IoT device.

26. The non-transitory computer readable medium of claim 25, wherein the instructions, when executed, further cause the first IoT device to mark the encrypted secret data as a multicast package prior to the transmission of the encrypted secret data.

* * * * *